(12) United States Patent
Kraft et al.

(10) Patent No.: US 8,200,715 B1
(45) Date of Patent: *Jun. 12, 2012

(54) USING STATUS MODELS WITH ADAPTABLE PROCESS STEPS IN A COMPUTER SYSTEM

(75) Inventors: Frank Michael Kraft, Speyer (DE); Bernhard Thimmel, Edingen-Neckarhausen (DE); Wasim Sadiq, Pullenvale (AU)

(73) Assignee: SAP AG, Walldorf (DE)

( * ) Notice: Subject to any disclaimer, the term of this patent is extended or adjusted under 35 U.S.C. 154(b) by 187 days.

This patent is subject to a terminal disclaimer.

(21) Appl. No.: 12/634,996

(22) Filed: Dec. 10, 2009

Related U.S. Application Data

(63) Continuation-in-part of application No. 11/617,464, filed on Dec. 28, 2006, which is a continuation-in-part of application No. 11/477,787, filed on Jun. 30, 2006.

(51) Int. Cl.
G06F 7/00 (2006.01)
G06F 17/30 (2006.01)
(52) U.S. Cl. ........ 707/803; 707/802; 707/807; 717/104; 719/316
(58) Field of Classification Search ........................ None
See application file for complete search history.

(56) References Cited

U.S. PATENT DOCUMENTS

| | | | |
|---|---|---|---|
| 5,212,792 A | 5/1993 | Gerety et al. |
| 5,295,222 A | 3/1994 | Wadhwa et al. |
| 5,404,496 A | 4/1995 | Burroughs et al. |
| 5,652,714 A | 7/1997 | Peterson et al. |
| 5,758,029 A | 5/1998 | Hall |
| 5,781,545 A | 7/1998 | Matthew |
| 5,890,146 A | 3/1999 | Wavish et al. |
| 5,920,718 A | 7/1999 | Uczekaj et al. |
| 5,983,016 A | 11/1999 | Brodsky et al. |
| 5,991,733 A | 11/1999 | Aleia et al. |
| 6,078,325 A | 6/2000 | Jolissaint et al. |
| 6,151,023 A | 11/2000 | Chari |

(Continued)

FOREIGN PATENT DOCUMENTS

EP 1 674 990 6/2006

(Continued)

OTHER PUBLICATIONS

U.S. Appl. No. 11/617,464, filed Jun. 2008, Kraft et al.*

(Continued)

*Primary Examiner* — Hosain Alam
*Assistant Examiner* — Azam Cheema
(74) *Attorney, Agent, or Firm* — Fish & Richardson P.C.

(57) ABSTRACT

Techniques are described for using a design-time status schema model to describe the progress of a data object through a computing process. The status schema model includes status variables, processing actions and constraints for performing actions. The status schema model also includes preconditions for performing actions and a modeling element where the modeling element indicates a process step for a business process where the process step can be switched on and off at runtime. A precondition belonging to the process step identifies how a status affects whether an action is to be allowed to be performed at runtime by a data object node instance having the status. At runtime, the status schema model is used to control processing performed by, or on, an instance of a data object corresponding to the status schema model. The precondition is evaluated at runtime only if the process step is switched on.

18 Claims, 21 Drawing Sheets

U.S. PATENT DOCUMENTS

| | | | |
|---|---|---|---|
| 6,175,837 B1* | 1/2001 | Sharma et al. | 1/1 |
| 6,182,277 B1 | 1/2001 | DeGroot | |
| 6,308,224 B1 | 10/2001 | Leymann et al. | |
| 6,324,496 B1 | 11/2001 | Alur et al. | |
| 6,408,262 B1 | 6/2002 | Leerberg et al. | |
| 6,442,515 B1 | 8/2002 | Varma et al. | |
| 6,480,955 B1 | 11/2002 | DeKoning et al. | |
| 6,553,403 B1 | 4/2003 | Jarriel et al. | |
| 6,681,383 B1 | 1/2004 | Pastor et al. | |
| 6,769,048 B2 | 7/2004 | Goldberg et al. | |
| 6,772,036 B2 | 8/2004 | Eryurek et al. | |
| 7,120,896 B2 | 10/2006 | Budhiraja et al. | |
| 7,191,149 B1 | 3/2007 | Lanham et al. | |
| 7,451,447 B1 | 11/2008 | Deshpande | |
| 7,606,791 B2 | 10/2009 | Dettinger et al. | |
| 7,613,993 B1* | 11/2009 | Baer et al. | 715/205 |
| 7,761,337 B2 | 7/2010 | Caballero et al. | |
| 7,945,594 B2* | 5/2011 | Thimmel et al. | 707/802 |
| 7,966,621 B2* | 6/2011 | Kraft et al. | 719/320 |
| 8,020,172 B2* | 9/2011 | Kraft et al. | 719/316 |
| 2002/0013777 A1* | 1/2002 | Diener | 707/1 |
| 2002/0038206 A1 | 3/2002 | Dori | |
| 2002/0062475 A1 | 5/2002 | Iborra et al. | |
| 2002/0083413 A1 | 6/2002 | Kodosky et al. | |
| 2002/0138290 A1* | 9/2002 | Metcalfe et al. | 705/1 |
| 2002/0152102 A1 | 10/2002 | Brodersen et al. | |
| 2002/0167544 A1 | 11/2002 | Raghavan et al. | |
| 2002/0194388 A1 | 12/2002 | Boloker et al. | |
| 2003/0018461 A1 | 1/2003 | Beer et al. | |
| 2003/0028858 A1 | 2/2003 | Hines | |
| 2003/0046658 A1 | 3/2003 | Raghaven et al. | |
| 2003/0195789 A1 | 10/2003 | Yen | |
| 2004/0027388 A1 | 2/2004 | Berg et al. | |
| 2004/0049436 A1 | 3/2004 | Brand et al. | |
| 2004/0059808 A1 | 3/2004 | Galloway et al. | |
| 2004/0078258 A1 | 4/2004 | Schulz et al. | |
| 2004/0083448 A1 | 4/2004 | Schulz et al. | |
| 2004/0181775 A1 | 9/2004 | Anonsen et al. | |
| 2004/0193510 A1 | 9/2004 | Catahan, Jr. et al. | |
| 2004/0225919 A1 | 11/2004 | Reissman et al. | |
| 2004/0233232 A1 | 11/2004 | Iborra et al. | |
| 2005/0004888 A1* | 1/2005 | McCrady et al. | 707/1 |
| 2005/0004951 A1* | 1/2005 | Ciaramitaro et al. | 707/104.1 |
| 2005/0137928 A1* | 6/2005 | Scholl et al. | 705/9 |
| 2006/0085681 A1 | 4/2006 | Feldstein et al. | |
| 2006/0095439 A1* | 5/2006 | Buchmann et al. | 707/100 |
| 2006/0136923 A1 | 6/2006 | Kahn et al. | |
| 2006/0179383 A1 | 8/2006 | Blass et al. | |
| 2006/0227350 A1 | 10/2006 | Crawford et al. | |
| 2006/0265691 A1 | 11/2006 | Klinger et al. | |
| 2006/0294158 A1 | 12/2006 | Tsyganskiy et al. | |
| 2007/0142935 A1 | 6/2007 | Danielsson et al. | |
| 2007/0156427 A1 | 7/2007 | Dentzer et al. | |
| 2007/0226025 A1* | 9/2007 | Chang et al. | 705/8 |
| 2008/0005061 A1 | 1/2008 | Kraft | |
| 2008/0005152 A1 | 1/2008 | Kraft | |
| 2008/0005153 A1 | 1/2008 | Kraft | |
| 2008/0005162 A1 | 1/2008 | Kraft | |
| 2008/0005625 A1 | 1/2008 | Kraft | |
| 2008/0005739 A1 | 1/2008 | Sadiq | |
| 2008/0005743 A1 | 1/2008 | Kraft | |
| 2008/0005747 A1 | 1/2008 | Meyer et al. | |
| 2008/0015883 A1 | 1/2008 | Hermann | |
| 2008/0046862 A1 | 2/2008 | Sattler et al. | |
| 2008/0162672 A1 | 7/2008 | Krasinskiy | |
| 2009/0089309 A1 | 4/2009 | Thimmel | |

FOREIGN PATENT DOCUMENTS

WO    WO 2005/117549    12/2005

OTHER PUBLICATIONS

Final office action from U.S. Appl. No. 11/617,577, dated Aug. 25, 2010, 21 pages.

Final office action from U.S. Appl. No. 11/617,495, dated Aug. 25, 2010, 16 pages.

Office action from U.S. Appl. No. 11/617,464, dated Sep. 3, 2010, 14 pages.

'Unified Modeling Language: Superstructure Version 2.0' [online]. Object Management Group, 2005, [retrieved on Nov. 27, 2006]. Retrieved from the Internet: <URL: www.omg.org/docs/formal/05-07-04.pdf>, pp. 8-12.

'Status Management' [online]. SAP, [retrieved on Nov. 27, 2006]. Retrieved from the Internet: <URL: help.sap.com/saphelp_47x200/helpdata/en/ee/41f79346ee11d189470000e829fbbd/content.htm>, 2 pages.

Status Management [online]. SAP, [retrieved on Nov. 27, 2006]. Retrieved from the Internet: <URL: help.sap.com/saphelp_47x200/helpdata/en/f0/ca3965260211d28a430000e829fbbd/content.htm>, 1 page.

'User Status' [online]. SAP, [retrieved on Nov. 27, 2006]. Retrieved from the Internet: <URL: help.sap.com/saphelp_47x200/helpdata/en/f0/ca39a6260211d28a430000e829fbbd/content.htm>, 1 page.

'Workflow Management Coalition the Workflow Reference Model' [online]. Workflow Management Coalition, 1995, [retrieved on Nov. 27, 2006]. Retrieved from the Internet: <URL: www.wfmc.org/standards/docs/tc003v11.pdf>, 55 pages.

'Introduction to OMG's Unified Modeling Language™ (UML®)' [online]. Object Management Group, 2005 [retrieved on Nov. 26, 2006]. Retrieved from the Internet: <URL:omg.org/gettingstarted/what_is_uml.htm>, 16 pages.

Leavens, Gary T. et al., "Preliminary Design of JML: A Behavioral Interface Specification Language of Java," ACM SIGSOFT Software Engineering Notes, vol. 31, No. 3, May 2006, pp. 1-38.

Kiczales, Gregor et al., "An Overview of AspectJ," Lecture notes in Computer Science, Springer Verlag, Berlin, Germany, vol. 2072, Jun. 18, 2001, pp. 327-353.

Jason Zhicheng Li, "Business Object State Management Using State Machine Compiler," Internet Citation, May 1, 2006 (May 2, 2006), XP002396380, Retrieved from the internet: http://today.java.ne/pub/a/today/2006/01/05/business-object-state management-using-smc.html, retrieved Aug. 24, 2006.

Eric Armstrong, "How to implement state-dependent behavior—Doing the State pattern in Java," internet citation, XP002246628 ISSN: 1091-8906, Retrieved from the internet: http://222.javaworld.com/javaworld/jw-8-1997/jw-08-stated_p.html, retrieved on Jul. 7, 2003.

W.M.P. van der Aaslt and M. Pesic, "DecSerFlow: Towards a Truly Declarative Service Flow Language", in M. Bravetti, M. Nunez, and G. Zavattaro, editors, International Conference on Web Services and Formal Methods (WS-FM 2006), vol. 4184 of Lecture Notes in Computer Science, pp. 1-23, Springer-Verlag, Berlin, 2006.

Lohman et al., "Behavioral Contraints for Services", Business Process Management, 5th International Conference, BPM, 2007, Brisbane, Australia.

Holger Giese, "Object-Oriented Design and Architecture of Distributed Systems", Inaugural-Dissertation, Department of Mathematics and Computer Science, Faculty of Mathematics and Natural Science, Westfälischen Wilhelms-Universität Münster, for the degree of Doctor of Science, Feb. 2001.

Beugnard et al., "Making Components Contract Aware", IEEE Computer Society, Jul. 1999, pp. 38-45.

Wirtz et al., "The OCoN Approach to Workflow Modeling in Object-Oriented Systems", Information Systems Frontiers 3:3, 357-376, 2001.

"Unified Modeling Language: Superstructure", Version 2.0, formal/Jul. 4, 2005, Object Management Group, Aug. 2005.

"Unified Modeling Language: Infrastructure", Version 2.1.1 (without change bars), formal/Jul. 2, 2006, Object Management Group, Feb. 2007.

"Unified Modeling Language: Superstructure", Version 2.1.1 (non-change bar), formal/Jul. 2, 2005, Object Management Group, Feb. 2007.

"Object Constraint Language", OMG Available Specification, Version 2.0, formal/Jun. 5, 2001, Object Management Group, May 2006.

Baldan et al., "Functorial Concurrent Semantics for Petri Nets and Read and Inhibitor Arcs", Lecture Notes in Computer Science, vol. 1877, Proceedings of the 11th International Conference on Concurrency Theory, Springer-Verlag, 2000.

"Business Process Modeling Notation Specification", Final Adopted Specification, dtc/Jun. 2, 2001, Object Management Group, Feb. 2006.

S. Christensen and N. Hansen, "Coloured Petri Nets Extended with Place Capacities, Test Arcs and Inhibitor Arcs", Lecture Notes in Computer Science, vol. 691, Proceedings of the 14$^{th}$ International Conference on Application and Theory of Petri Nets, Springer-Verlag, 1993.

S. Stelting et al., "Applied Java Patterns" (Online), Dec. 26, 2001, Prentice Hall, retrieved from the internet: http://proquest.safaribooksonline.com/0130935387?tocview=true>, retrieved Aug. 7, 2009).

International Search Report and Written Opinion of the International Searching Authority issued on Nov. 30, 2007, in corresponding application PCT/ EP2007/005785.

International Search Report and Written Opinion of the International Searching Authority issued in PCT/EP2007/005783 on Jan. 7, 2009.

International Search Report and Written Opinion of the International Searching Authority issued in PCT/EP2007/005779 on Dec. 30, 2008.

International Search Report and Written Opinion of the International Searching Authority issued in PCT/EP2007/005782 on Dec. 30, 2008.

International Search Report and Written Opinion of the International Searching Authority issued in PCT/EP2007/005786 on Jan. 8, 2009.

International Search Report and Written Opinion of the International Searching Authority issued in PCT/EP2007/005784 on Dec. 29, 2008.

International Search Report and Written Opinion of the International Searching Authority issued in PCT/EP2007/005781 on Dec. 30, 2008.

Extended European Search Report issued in 07025131.9-1243/1939744 on Aug. 19, 2009.

Non-Final Office Action issued in U.S. Appl. No. 11/617,462 on Nov. 20, 2009.

Non-Final Office Action issued in U.S. Appl. No. 11/862,813 on Nov. 25, 2009.

Kraft et al., U.S. Appl. No. 12/102,548, filed Apr. 14, 2008.

Thimmel et al., U.S. Appl. No. 12/020,984, filed Jan. 28, 2008.

Kraft et al., U.S. Appl. No. 12/634,834, filed Dec. 10, 2009.

Final office action from U.S. Appl. No. 12/020,984, dated Sep. 30, 2010, 17 pages.

Office action from U.S. Appl. No. 11/617,462, dated Nov. 1, 2010, 16 pages.

Office action from U.S. Appl. No. 11/617,647, dated Nov. 5, 2010, 26 pages.

Office action from U.S. Appl. No. 11/617,638, dated Sep. 30, 2010, 16 pages.

Non-Final Office Action issued in U.S. Appl. No. 11/477,787 on Dec. 29, 2009, 12 pages.

Final office action from U.S. Appl. No. 11/477,787 dated Jun. 24, 2010, 18 pages.

Non-Final Office Action issued in U.S. Appl. No. 11/617,580 on Dec. 30, 2009, 13 pages.

Merriam-Webster Online, "Programmatically—Definition and More from the Free Merriam Webster" downloaded Jun. 16, 2010, http://www.merriam-webster.com/dictionary/programmatically.

Office action from U.S. Appl. No. 11/617,577 dated Mar. 25, 2010, 21 pages.

Office action from U.S. Appl. No. 11/617,495 dated Mar. 18, 2010, 17 pages.

Final Office Action from U.S. Appl. No. 11/617,580 dated Jun. 24, 2010, 13 pages.

Office action from U.S. Appl. No. 11/617,616 dated Apr. 19, 2010, 15 pages.

Office action from U.S. Appl. No. 11/617,462 dated May 11, 2010, 23 pages.

Final Office Action from U.S. Appl. No. 11/862,813 dated Jun. 11, 2010, 7 pages.

Office action from U.S. Appl. No. 12/020,984 dated Apr. 12, 2010, 10 pages.

Office action from U.S. Appl. No. 11/617,464, dated Feb. 28, 2011, 14 pages.

Office action from U.S. Appl. No. 11/617,580, dated Dec. 8, 2011, 37 pages.

Office action from U.S. Appl. No. 12/333,197. dated Oct. 14, 2011, 14 pages.

Office action from U.S. Appl. No. 12/634,834, dated Oct. 12, 2011, 17 pages.

Final office action from U.S. Appl. No. 11/617,647, dated Jul. 11, 2011, 26 pages.

Final office action from U.S. Appl. No. 11/617,462, dated Jul. 21, 2011, 19 pages.

* cited by examiner

USING STATUS MODELS WITH ADAPTABLE PROCESS STEPS IN A COMPUTER SYSTEM

CROSS REFERENCE TO RELATED APPLICATIONS

This application is a continuation-in-part of U.S. application Ser. No. 11/617,464, filed Dec. 28, 2006 and titled USING STATUS MODELS IN A COMPUTER SYSTEM, which is a continuation-in-part of U.S. application Ser. No. 11/477,787, filed Jun. 30, 2006 and titled SYSTEM AND METHOD FOR OBJECT STATE MANAGEMENT.

TECHNICAL FIELD

This description relates to techniques for controlling transaction processing that is performed by computer systems.

BACKGROUND

Software systems and components may be developed using object technology, and the operation of these systems and components may occur through methods that are performed on and/or by objects. An object's state may be said to include the combination of current attribute values of the object at a particular point in time. The execution of a method may change attribute values of an object, which, in turn, may lead to a new state of the object. Sometimes the current state of the object or computing environment may be an important factor in determining whether a particular action is allowed to be performed or not.

One approach to ensuring that an object performs an action only when allowed by a particular state of the object is programming such requirements into the object itself. Another approach is to rely on the programming of other unrelated objects—that are called by the object to implement all or part of the action—to enforce such requirements.

For example, software that controls an assembly line in a manufacturing plant should be programmed so that a "stop" action should not be performed on the assembly line if the assembly line current is not moving (e.g., as represented by the state of an object representing the assembly line).

Under the first scenario described above, a programmer of the object may directly code this requirement into the object itself, so that when the object receives a "stop" action request, the object checks its own status attributes to make sure that the assembly line is currently moving before allowing the "stop" action to be processed. However, as software projects become larger and more complex, it may become increasingly burdensome for programmers to understand, identify and account for all constraints that are based on the state of an object.

Under the second scenario described above, the programmer of the object may rely on other programming to enforce this requirement. In this example, the assembly line object (which may or may not have its own status attributes regarding the movement of the assembly line) would receive the "stop" active request, and call another unrelated object to implement all or part of the "stop" action. The other object would then check its own status attributes to make sure that the assembly line is currently moving before allowing the "stop" action to be processed, but its determination would be independent of the state of the assembly line object.

An application program or system running on a computer may be customized to meet the specific requirements of a group of users, such as a particular company or a particular department in a company. Examples of application programs or systems include, for example, an enterprise resource management system, a financial management system, a human resources management system, a supply chain management system, and a marketing system.

SUMMARY

In one general aspect, a status schema model is defined at design-time, stored in computer-readable medium, and includes preconditions for performing actions and a modeling element. The modeling element indicates a process step for a business process where the process step can be switched on and off at runtime. A precondition belonging to the process step identifies how a status affects whether an action is to be allowed to be performed at runtime by a data object node instance having the status. The precondition is evaluated at runtime only if the process step is switched on. A status schema instance for a particular data object node instance being used in a computer-based process is created at runtime. The status schema instance corresponds to the status schema model. The data object node instance includes values for variables and methods capable of being performed by the data object node instance. Based on the status schema instance, status of the data object node instance is monitored to determine whether a particular action is allowed to be performed by the data object node instance conditioned on the process step being switched on. In response to a determination that the particular action is allowed, the particular action to be executed is enabled.

Implementations may include one or more of the following features. For example, the process step may be switched on at runtime based on the status of the data object node instance. The process step may be switched off at runtime based on the status of the data object node instance. The status schema model may correspond to a data object node, and the data object node instance may correspond to the data object node. The status of the data object node instance may include a status variable and a particular status value where the particular status value is one of a set of possible status values for the status variable. The modeling element may indicate the process step includes the action and the action may be inhibited if the process step is switched off. The modeling element may indicate the process step includes a status variable and the status variable may be disabled and may not have a well-defined value if the process step is switched off.

A mode schema model may be defined at design-time, stored in computer-readable medium, and identify conditions under which the process step is allowed to be switched. A mode schema instance for the data object node instance may be created where mode schema instance corresponds to the mode schema model.

The mode schema model may include a mode variable identifying whether the process step is switched on. The process step may include variants, and a variant of the process step may be selected when the process step is switched on. The mode schema may include a mode variable identifying which variant of the process step is switched on, and the mode scheme may indicate under what conditions the variant is switched on.

Implementations of any of the techniques described above may include a method or process, an apparatus or system, or computer software on a computer-accessible medium. The details of particular implementations are set forth in the accompanying drawings and description below. Other fea-

DESCRIPTION OF DRAWINGS

FIG. 14 is a block diagram of a computer system that uses a constraint-based model to control data processing where the constraint-based model includes an adaptable process step.

Like reference symbols in the various drawings indicate like elements.

DETAILED DESCRIPTION

Techniques are provided that allow for the management of the state of an object node in a less burdensome and more coherent manner. There are various ways of implementing objects in software applications. The term "object node" is used in this description to refer to either an overall object or particular elements of an object (e.g., particular methods and/or attributes associated with the object). When an object node is used in a business software application, the object node may be referred to as a business object node or an application object node. The term "data object node" also may be used to refer to an object node. A data object node may refer to a business object node, for example, that includes variables and methods related to a business entity, such as a document (e.g., a sales order, a purchase order or an invoice), an organization (e.g., such as a business partner, supplier or customer) or a person (e.g., such as an employee or a customer). A data object node also may refer to a processing object node, such as an object node that processing information for an entity being processed in a workflow.

Figure 1:
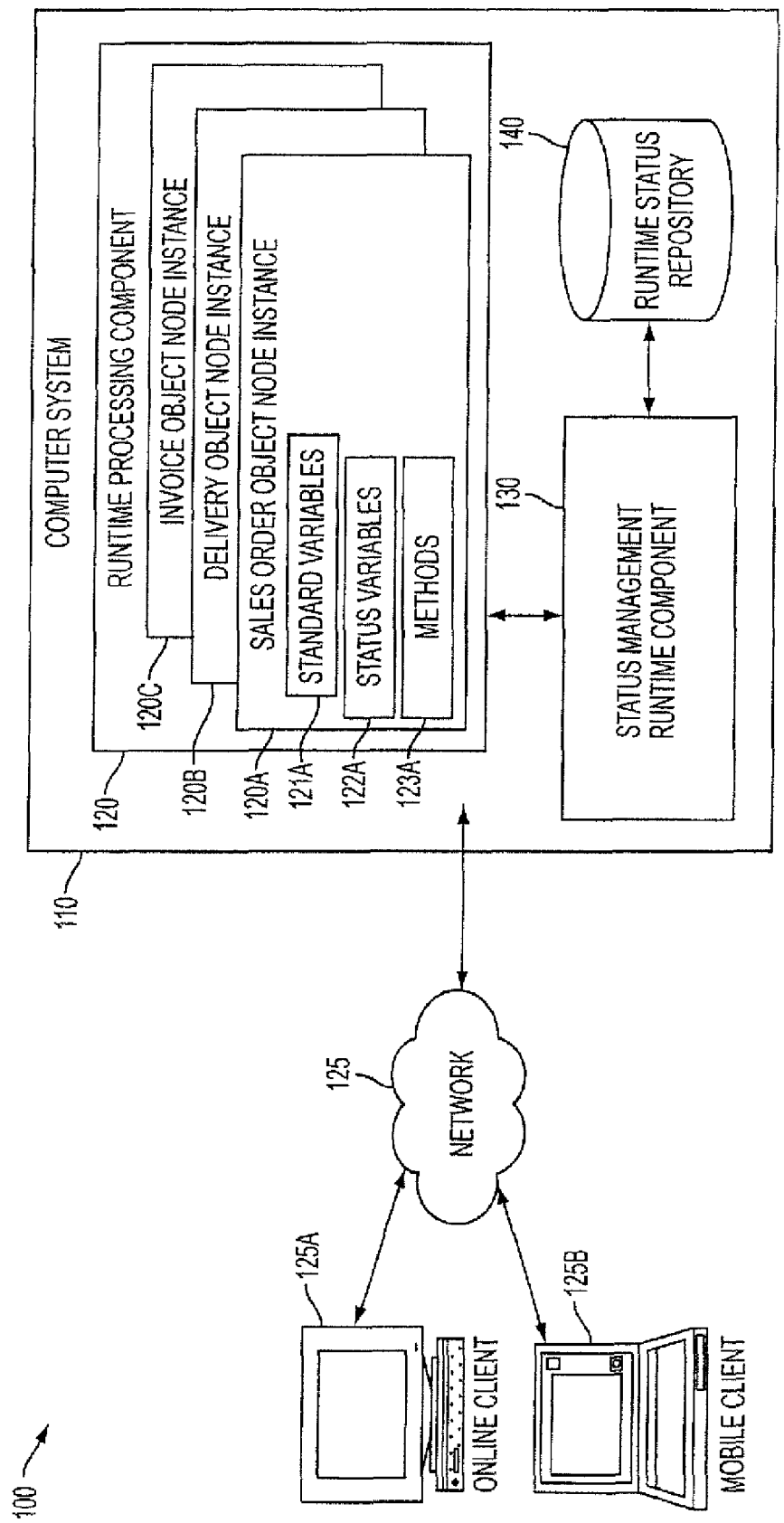
FIGS. 1, 3, 14 and 21 are block diagrams of computer systems that use a constraint-based model to control data processing.

FIG. 1 shows a system 100 of networked computers that uses a constraint-based model to control data processing. In general, the system 100 uses a status schema instance of a status schema model to determine whether an action is permitted to be performed by a data object node.

More particularly, the system 100 of networked computers includes a computer system 110 having a runtime processing component 120, a runtime status management component 130 and a runtime status repository 140. The computer system 110 may be a general-purpose computer or a special-purpose computer.

The runtime processing component 120 includes various data object nodes (here, sales order object node instance 120A, a delivery object node instance 120B and an invoice object node instance 120C). Each of the object node instances 120A, 120B and 120C is a collection of data variables and methods that may be performed by the data object node instance. In this example, each instance 120A-120C has standard variables, each of which corresponds to a characteristic or attribute of the object node instance. For example, a sales order object node instance 120A may include, for example, standard variables identifying a customer to whom the sale was made and the date of the sale. Each instance 120A-120C also has one or more status variables. A status variable indicates a status of the data object node instance. For example, a status variable may indicate the status of a data object node instance relative to a stage of processing. In a more particular example, a status variable may indicate whether a sales order object node instance 120 has been approved. Each instance 120A-120C also has methods that may be executed by the object node instance. As shown, the sales order object node instance 120A has standard variables 121A, status variables 122A and methods 123A. The object node instances 120B and 120C also have standard variables, status variables and methods (not shown).

As shown here, the object node instances 120A, 120B and 120C each correspond to a principal entity represented in the computer system 110. Each of the example object node instances 120A-120C relate to a document used in a business process—here, respectively, the instances correspond to documents used in the business process of delivering and invoicing merchandise sold to a customer. Another example of a data object node instance include information about a customer, an employee, a product, and a business partner (such as a supplier). A data object node instance may be stored as one or more rows in a relational database table (or tables), a persistent object instance in an object-oriented database, data in one or more extensible mark-up language (XML) files, or one or more records in a data file.

In some implementations, an object node instance may be related to other object node instances. In one example, a sales order may include multiple sales order nodes, such as a root node identifying information that applies to the sales order (such as information that identifies the customer and the date the sales order was placed) and one or more item nodes identifying information related to each type of item ordered (such as an item number, quantity ordered, price of each item and cost of items ordered). In another example, each of the sales order object node instance 120A, delivery object node instance 120B and invoice object node instance 120C may relate to a sale of merchandise to a customer. As such, each of object node instances 120A-120C may be said to relate to one another.

Figure 2:
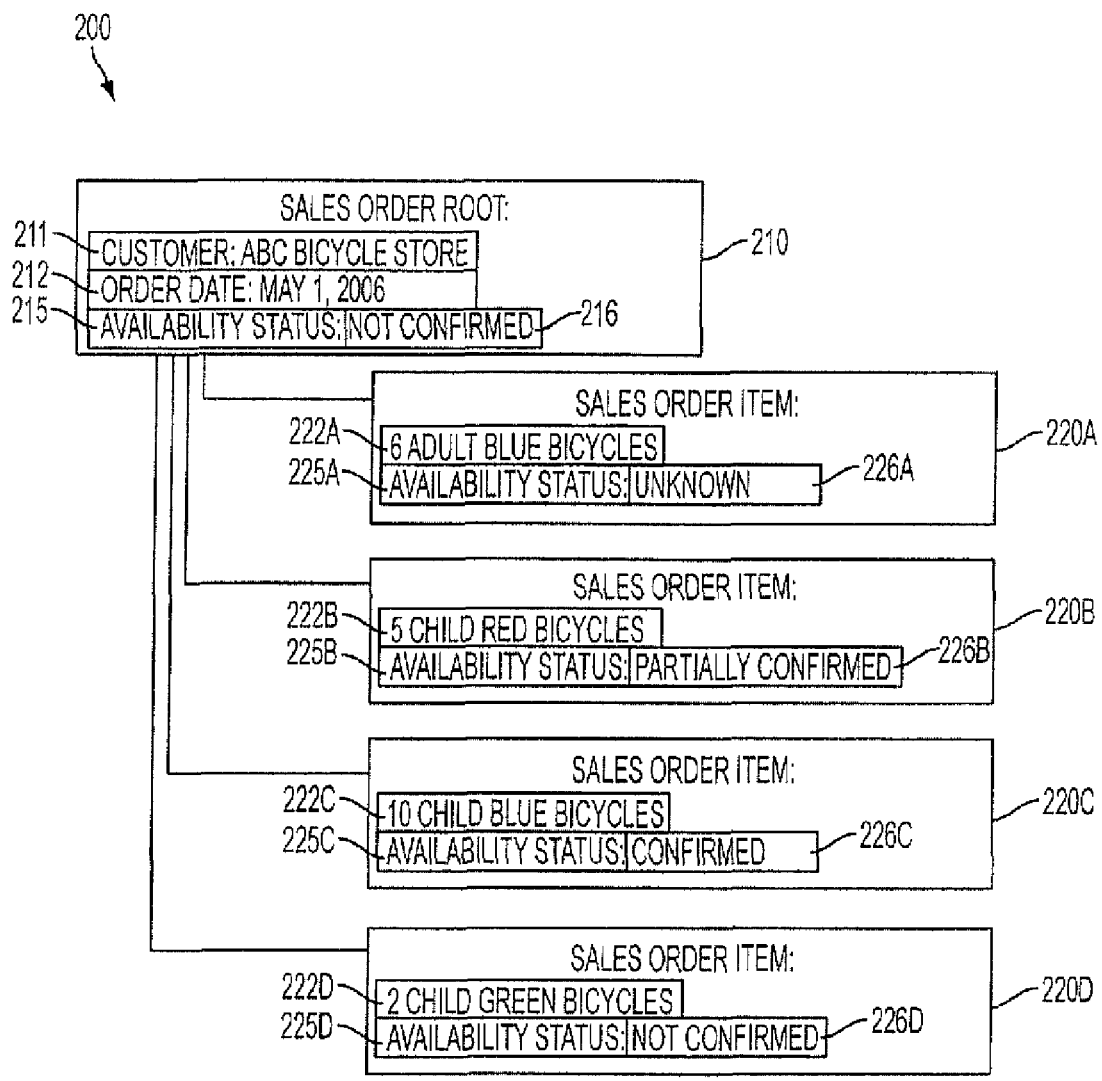
FIG. 2 is a block diagram of runtime sales order nodes instances.

FIG. 2 illustrates an example of runtime sales order node instances 200, which collectively represent a sales order by a customer (i.e., "ABC Bicycle Store") for products (i.e., bicycles). In this example, a sales order root instance 210 is related to sales order item instances 220A-220D. The sales order root instance 210 may be referred to as the parent node of each of the sales order item instances 220A-220D. In turn, each of the sales order item instances 220A-220D may be said to be a child node of the sales order root instance 210. Each of the sales order item instances 220A-220D also may be referred to as a sibling node of the other sales order item instances 220A-220D.

More particularly, the sales order root instance 210 has a customer 211 variable with a value "ABC Bicycle Store" and an order date 212 variable with a value of "May 1, 2006." Each variable 211 and 212 may be referred to as a standard variable or characteristic of the sales order root. The sales order root 210 has an availability status variable 215 having a value 216 of NOT CONFIRMED. As described more fully later, the availability status value of 216 is a reflection of the available status values of the sales order item instances 220A-220D.

Each of the sales order item instances 220A-220D have a standard variable 222A-222D with a value describing a type of bicycle and a corresponding quantity purchased. For example, sales order item instance 220A has a standard variable 222A identifying "6 adult blue bicycles" as the type and quantity of a bicycle purchased.

Each of the sales order item instances 220A-220D also has an availability status variable 225A-225D having a value 226A-226D that identifies the availability status of the bicycles identified in the standard variable 225A-225D. For example, the sales order item 220A has an availability status value 226A of UNKNOWN for six adult blue bicycles; the sales order item 220B has an availability status value 226B of PARTIALLY CONFIRMED for five child red bicycles; the sales order item 220C has an availability status value 226C of CONFIRMED for ten child blue bicycles; and the sales order item 220D has an availability status value of NOT CONFIRMED for two child green bicycles.

Referring again to FIG. 1, the status management runtime 130 tracks status information associated with object node instances 120A-120C in the status repository 140 and makes determinations, on behalf of the object node instances, as to whether actions are allowed to be performed based at least in part on the status information associated with the object nodes in the status repository.

When one of the object node instances 120A, 120B or 120C of the runtime processing component 120 receives a request to perform an action, the object node instance 120A, 120B or 120C sends a request to the status management runtime component 130 to determine whether the action is allowed to be performed. The status management runtime component 130 checks the runtime status repository 140 to determine whether the status information associated with the object node instance 120A, 120B or 120C permits the action to be performed. The status information associated with the object node instance may include the values of one or more status variables associated with the object node instance and one or more constraints identifying what actions may be allowed to be performed based at least in part on the values of the one or more status variables. The status information also may include one or more constraints identifying what status variable values may be allowed to be set following the performance of an action. The status information may include one or more constraints identifying what status variable values may be changed based on a change in one or more other status variable values.

When the outcome of the determination specifies that the action is not allowed, the status management runtime component 130 sends a response to the object node instance 120A, 120B or 120C indicating that the action is not allowed to be performed, and the object node instance 120A, 120B or 120C processes the negative response by inhibiting the action from being performed. One example of inhibiting the action is to send an error message to the source that requested the action to be performed. Another example is to simply ignore the action request and continue on as if the action had never been requested. Yet another example is forwarding the negative response to another application for processing.

On the other hand, when the outcome of the determination specifies that the action is allowed, the status management runtime component 130 sends a response to the object node instance 120A, 120B or 120C indicating that the action is allowed to be performed, and the object node instance 120A, 120B or 120C processes the positive response. One example of processing a positive response is performing the action. Another example of processing the possible response is by forwarding the response to another application for processing.

In some implementations, a list of requested actions may be sent to an object node instance 120A, 120B or 120C for determinations of the requested actions and subsequently returns the positive and/or negative responses to the client application for further processing.

Status variable value information associated with an object node instance may be previously stored in the status repository 140 or passed by the object node instance along with the check action request.

The status information also may be based on a status schema instance derived from a design-time model. The status schema instance may include relevant status variables and associated status values, actions and conditions modeled for corresponding object nodes and stored in the status repository 140. For example, at design-time, the status schema for an object node, may define constraints for actions by describing which actions are allowed for which status values, and define which status values may be or are set after the completion of the action. At runtime, a status schema instance may be loaded from the status repository 140 by the status management runtime 130 with the current values of the status variables for object node instances.

The runtime processing component 120 illustrates a service-based approach in which services are provided by object node instances 120A-120C to other computing entities over the network 125. Examples of the network 125 include the Internet, wide area networks (WANs), local area networks (LANs), or any other wired or wireless network. As illustrated in this example, services are offered to an online client system 125A and a mobile client system 125B, which each may be a general-purpose computer that is capable of operating as a client of the runtime processing component (such as a desktop personal computer, a workstation, or a laptop computer running an application program), or a more special-purpose computer (such as a device specifically programmed to operate as a client of a particular application program). For brevity, FIG. 1 illustrates only a single online client system 125A and a single mobile client system 125B. However, actual implementations may include many such computer systems.

The architecture of system 100 illustrates a service-oriented architecture, which defines objects and relationships of objects to provide services usable by other computing systems or components. The service-oriented architecture (or portions thereof) may be developed and licensed (or sold) by a commercial software developer. The service-oriented architecture 100 is one example of a computing environment in which the described principles, concepts and techniques may be implemented. The techniques apply to other architectures and system designs, as would be understood by a person skilled in the art. The service-oriented architecture is being described to illustrate an example to help articulate the described techniques.

In another example, the described techniques may be implemented in a software application or software components that are developed and licensed (or sold) by a commercial software developer. Examples of commercial software applications include customer relationship management or sales applications, supply chain management applications, financial management applications, or human resources management applications. The applications may work in conjunction with one or more other types of computer applications to form an integrated enterprise information technology (IT) solution for a business enterprise. In some architectures, for example, a service-oriented architecture, the described techniques may be implemented in data objects and as software service components.

The architecture shown in FIG. 1 may allow for a less burdensome and more coherent state management of an object node instance by providing a status management runtime component 130. The runtime processing component 120 in some implementations may correspond to an application runtime component. Although the status management runtime component 130 is depicted as a separate runtime component from the runtime processing component 120, the status management runtime component 130 need not necessarily be a separate component. In one example, the status management runtime component 130 may be part of the runtime processing component 120. In another example, some or all of the functions described with respect to the status management runtime component 130 may be performed by the runtime processing component 120.

As a result of the architecture shown in FIG. 1, object node programmers need only to code calls to the status management runtime 130 to make sure an action is allowed to be performed, instead of having to understand, identify and account for all constraints that are based on the status of an object node instance. Additionally, by having object node status information represented in the status repository 140, the status management runtime 130 is able to use this information in a coherent manner as to not make any determination independent of an object node instance's state.

As described previously, a data object node at design-time may have multiple status variables, each status variable has a predetermined, mutually exclusive set of possible status values. At runtime, each status variable of a data object node instance has one of the possible status values, which may be referred to as the current value of the status variable. The current value of all status variables of a data object node instance may be referred to as the "current status" of the data object node instance. Alternatively, in some implementations, the current value of all status variables of a data object node instance may be referred to as the "state" of the data object node instance. In this description, the term "state" of the data object node instance generally is used to refer to the current value of all variables (both status variables and standard variables), whereas the term "current status" of the data object node instance generally is used to refer to the current value of all status variables (and not including the current value of standard variables).

Figure 3:
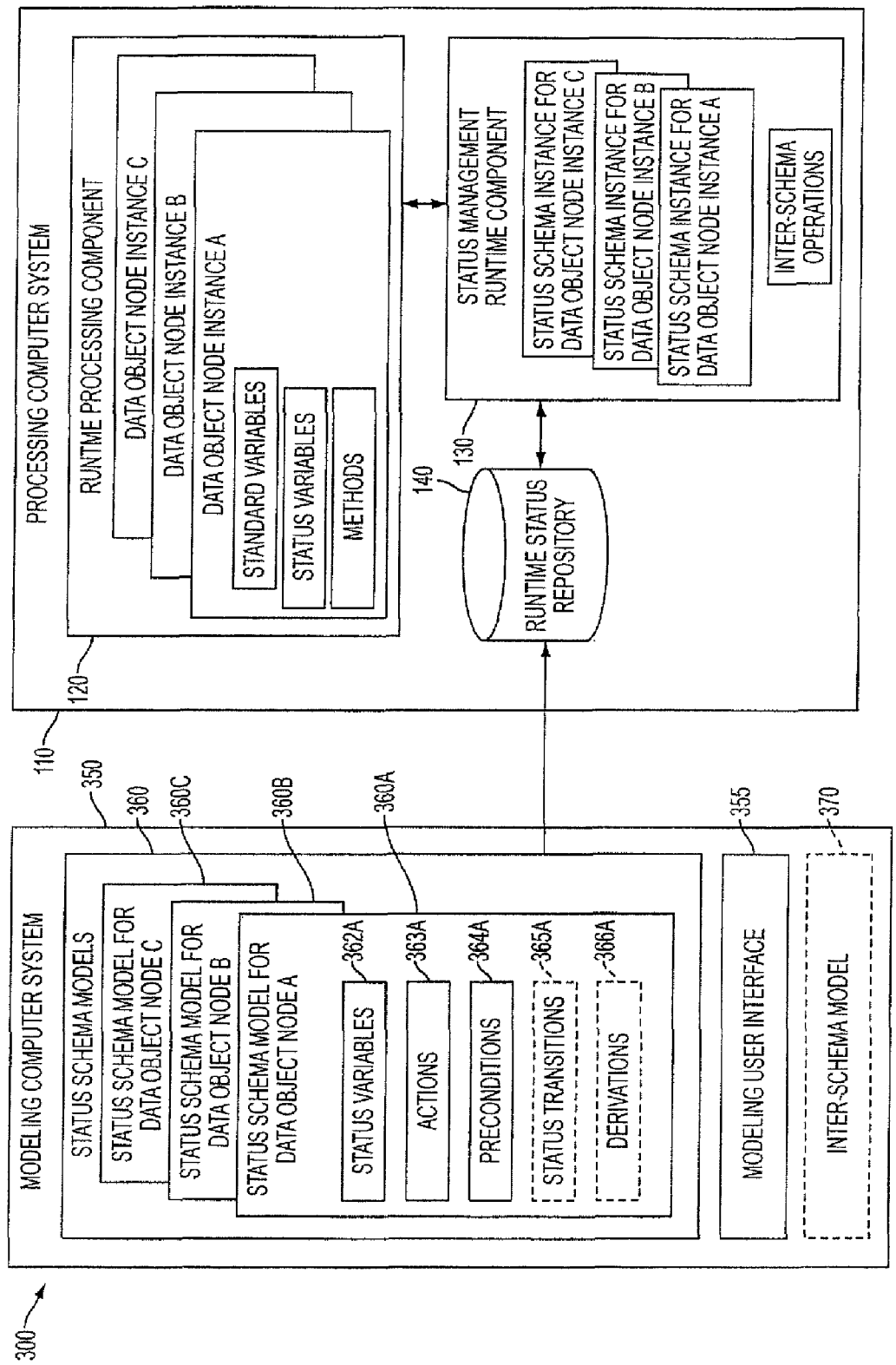

FIG. 3 shows another example of a system 300 of networked computers that uses a constraint-based model to control processing of data object node instances. The system 300, like the system 100 of FIG. 1, includes a computer system 110 having a runtime processing component 120, a status management runtime component 130, and a status repository 140. In this example, the computer system 110 may be referred to as a processing computer system 110.

The system 300 also includes a modeling computer system 350 capable of generating and presenting on a display device (or devices) a modeling user interface 355 for defining status schema models 360 for data object nodes. A data object node corresponds to one or more data object node instances, each of which is capable of being processed by the processing computer system 110. In general, once the status schema models 360 have been defined and, perhaps, simulated on the modeling computer system, the status schema models 360 are transformed into a format usable by the status management runtime component 130 and stored in the runtime status repository 140. As described previously, the status management runtime component 130 uses information in the runtime status repository 140 to determine whether the status information associated with a data object node instance permits a particular action to be performed by the data object node instance. As such, the status schema models are created in the modeling environment (here, represented by the modeling computer system) and used without modification by the runtime environment (here, represented by the processing computer system).

More particularly, the modeling user interface 355 enables a user at design-time to define a status schema model for a data object node. A data object node also is associated with a data model defining standard variables, status variables and methods for the data object node, and, therefore, for data object node instances generated for the data object node.

In general, a status schema model identifies constraints for performing an action of a data object node. More particularly, the status schema models 360 include a status schema model 360A for data object node A, a status schema model 360B for data object node B, and a status schema model 360C for data object node C. As illustrated by the status schema model 360A, each status schema model 360A, 360B or 360C, includes status variables 362A (and for each status variable, a set of predefined permissible values) and actions 363A. As shown, each status schema model includes preconditions (such as preconditions 364A for status schema model 360A). A precondition identifies how a status affects whether an action is to be performed at runtime by a data object node instance having the status. For example, a precondition may identify a condition that must be fulfilled for an action to be performed by a data object node instance corresponding to the data object node to which the status schema model corresponds. An action (such as one of actions 363A) represents a process step that can be performed on an instance of a data object node for which the status schema model corresponds. A precondition (such as one of preconditions 364A) is a type of constraint that generally relates an action with a status value of one of the status variables 362A. A precondition may enable or inhibit an action. At runtime, the preconditions of an action are evaluated to determine whether the action is permitted to be performed on or by the data object node instance to which the status schema model relates.

Another type of constraint which may be used in some status schema models is a status transition. A status transition represents a status value of a status variable that is permitted to be set when a particular action is performed on a data object node instance corresponding to the status schema model of the data object node. The architecture 300 optionally includes status transitions 365A for status schema model 360A for object node A.

Each of status schema models 360B and 360C also include status variables, actions, and preconditions for actions (not shown). Each of status schema models 360B and 360C may include status transitions and derivations, described below (not shown).

The modeling user interface 355 also may support inter-schema modeling. For example, a status schema model for a data object node may include inter-schema modeling elements (such as derivations 366A associated with status schema model 360A). In another example, inter-schema modeling elements may be stored in a separate inter-schema model 370. Inter-schema modeling, for example, may model how a status variable in a status schema model of one data object node may influence a status variable in a status schema model of another data object node.

Two examples of such inter-schema processes are population and aggregation derivations. In general, a population derivation "pushes" or copies a status value of a status variable from a parent data object node to corresponding status variables in one or more child data object nodes of the parent data object node. An aggregation derivation determines an appropriate status value of a status variable for a parent data object node based on status values of the corresponding status variable in one or more child data object nodes. The architecture 300 optionally includes derivations 366A, which may include population derivations and aggregation derivations, for status schema model 360A for object node A.

The derivations 366A in the status schema model 360A for object node A also may include one or more lifecycle (or overall) status derivations for object node A. For example, when there are several status variables in the status schema model for object node A, the model may include a status variable that reflects an overall processing status of object node A. Such an overall status variable generally is not used to determine whether a particular action is permitted to be performed on an instance of the object node, although some implementations may use the status value of the lifecycle status variable to do so.

In many cases, the modeling computer system 350 is used by software developers or programmers who are designing and implementing status schema models which correspond to data object nodes. The status schema models and data object nodes may be used, for example, to enable a service-oriented architecture for processing data that is applicable to many business enterprises. In such a case, data object nodes along with the runtime status repository that corresponds to status schema models for the data object nodes may be sold (or licensed) to many business enterprises. Thus, the processing computer system 110 may be operated and used by a different business enterprise than the business enterprise that operates and uses the modeling computer system 350.

In some implementations, the modeling computer system 350 may be used to extend, enhance or otherwise add to the status schema models corresponding to the data object nodes used in the processing computer system 110. In such a context, the modeling computer system 350 may be used by a business enterprise other than the commercial software developer who designed and implemented data object nodes or the runtime status repository. The modeling computer system 350, for example, may be operated by a software integrator or consulting organization that is implementing or enhancing the runtime processing component for a particular, or group of, business enterprises. In a more particular example, an initial runtime status repository may be generated from a first modeling computer system based on status schema models provided by the commercial software development organization that designed, implemented and sold the data object nodes used by the runtime processing component. A consulting organization may use a second modeling computer system to extend the status schema models in permitted ways for use in a particular industry or by a particular business enterprise.

Because status schema models are defined for a data object node, the models enable the definitions of business processing with a fine granularity, which may help enable or improve process flexibility and reuse of the status schema models. Also, because the status schema models reflect business logic used in runtime processes, the status schema models promote visibility and transparency of business processes, which, in turn, may reduce application development errors and programming side-effects. Also, the status schema models may result in computer-supported business processes that more accurately reflect real-world business processes, which, in turn, may help to promote the development and proper use of more accurate and easier-to-understand computer systems.

Figure 4:
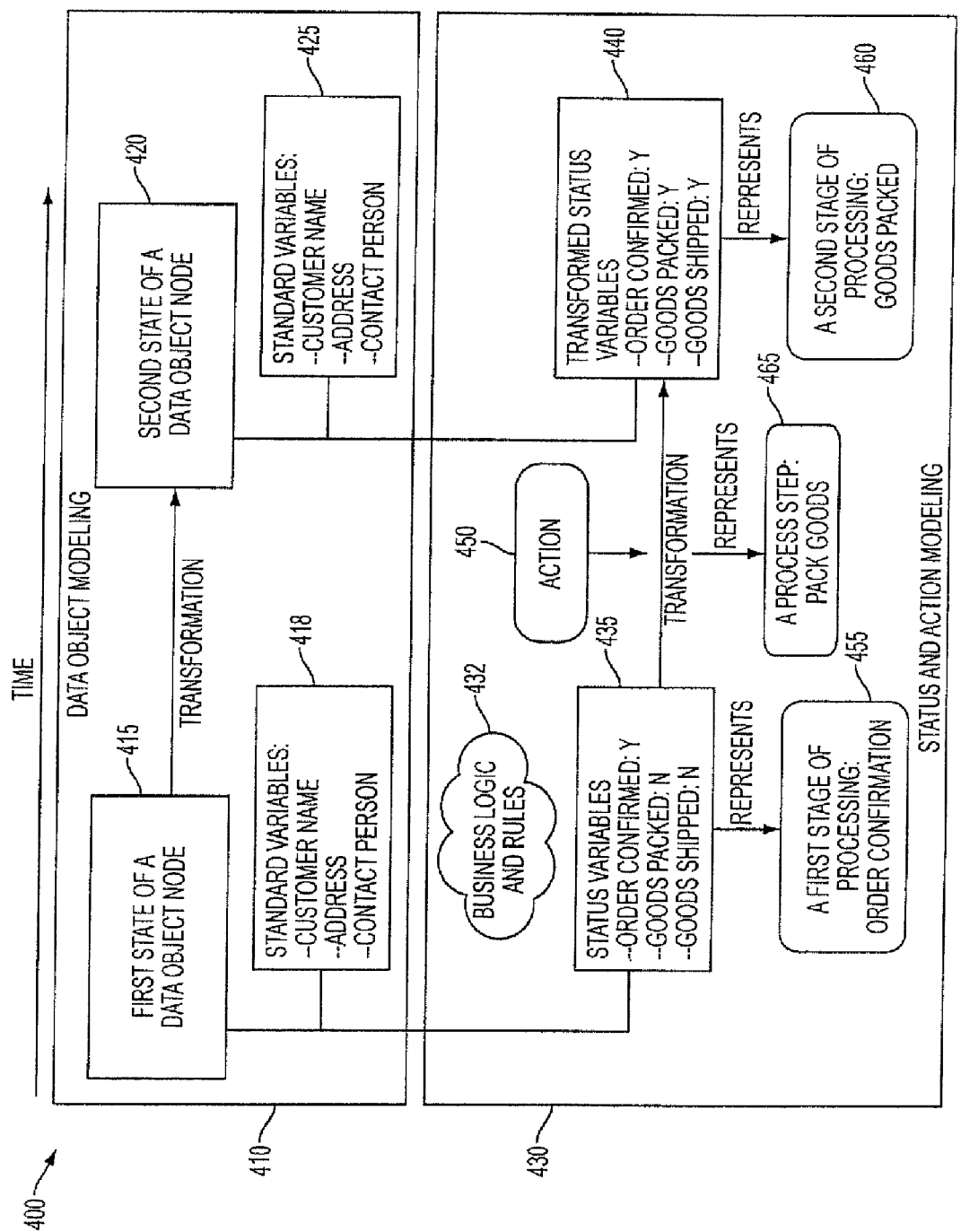
FIG. 4 is a block diagram of a status and action model architecture.

FIG. 4 depicts an example architecture 400 for a status and action model. The architecture 400 illustrates the components of one example of a status and action model in relationship to other computer system components, such as data object nodes. The component architecture 400 includes data object components 410 and status and action model components 430. In general, the component architecture 400 illustrates how a data object is transformed over time, and how the data object transformation is reflected in the status and action model.

The status and action model is an abstraction and a simplified image of real-world processes. The status and action model uses graphical representations as a means of presenting relevant aspects of the corresponding real-world processes. Here, the status and action model components 430 illustrate data objects and the execution of methods performed on the data objects during the operation of the computer system using the data objects. Stated differently, the status and action model components 430 illustrate the processing of a data object by a computer system, which generally corresponds to a real-world business process.

More particularly, while executing on a computer system, methods (or other types of computer-executable processes) change attribute values of data object nodes. The state of a data object node may be viewed as the combination of current attribute values of a data object node at a particular point in time. When an attribute value of a data object node is changed, the changing of the attribute value leads to a new state of the data object node. An attribute may be referred to as a variable, and an attribute value may be referred to as a value of a variable.

As shown in the component architecture 400, a data object node includes standard variables 418 and status variables 435. In this example, standard variables 418 relate to the data object itself and do not include status information, which is reflected in status variables 435. The standard variables are shown as part of the data object model 410 that corresponds to the status and action model component 430, whereas the status variables 435 of the data object node 415 are shown as part of the status and action model 430.

The component architecture 400 represents the transformation of a particular data object node from one state (here, called the first state 415) to another state (here, called the second state) 420, as shown in the data object model component 410. The status and action model component 430 depicts that business process step associated with the transformation of the data object node from the first state 415 to the second state 420.

As shown in the status and action model component 430, a particular action 450 results in the transformation of the status variables 435 to the transformed status variables 440. The current values of status variables (such as depicted in status variables 435 and 440) represents the state or stage of a process related to the data object node. More particularly, the current values of status variables 435 indicate that the data object node that is the subject of the component architecture model 400 represents the data object node being in the ORDER CONFIRMATION stage of processing, as indicated by stage of processing 455. Similarly, the current values of the status variables 440 of the data object node indicate that the data object node the data object node being in the GOODS PACKED stage of processing, as indicated by stage of processing 460. The transformation of the data object node from the ORDER CONFIRMATION status to the GOODS PACKED status is reflected in the transformation of the current values of the status variables 435 to the transformed values of the status variables 440, which results from the action 450. In this example, the action 450 represents a process step 465 of PACK GOODS.

As shown in this example, a status management model for a data object node illustrates the transformation of the data object node from one state to another state, as reflected in a value change to the variables of the data object node. The transformation reflects an action being performed on the data object node, which results in the change of one or more status variable values for the data object node. The action represents or corresponds to a process step performed on the data object node, and the state reflected by the values of the status variables represents or corresponds to a stage of processing. As shown, it may be said that the process step results in a change of the current stage of that the processing of the data object node. The status and action model component may be said to represent or make visible business logic and rules describing how a data object node is transformed from one state to another state, as illustrated by the business logic and rules representation 432.

Figures 5A, 5B:
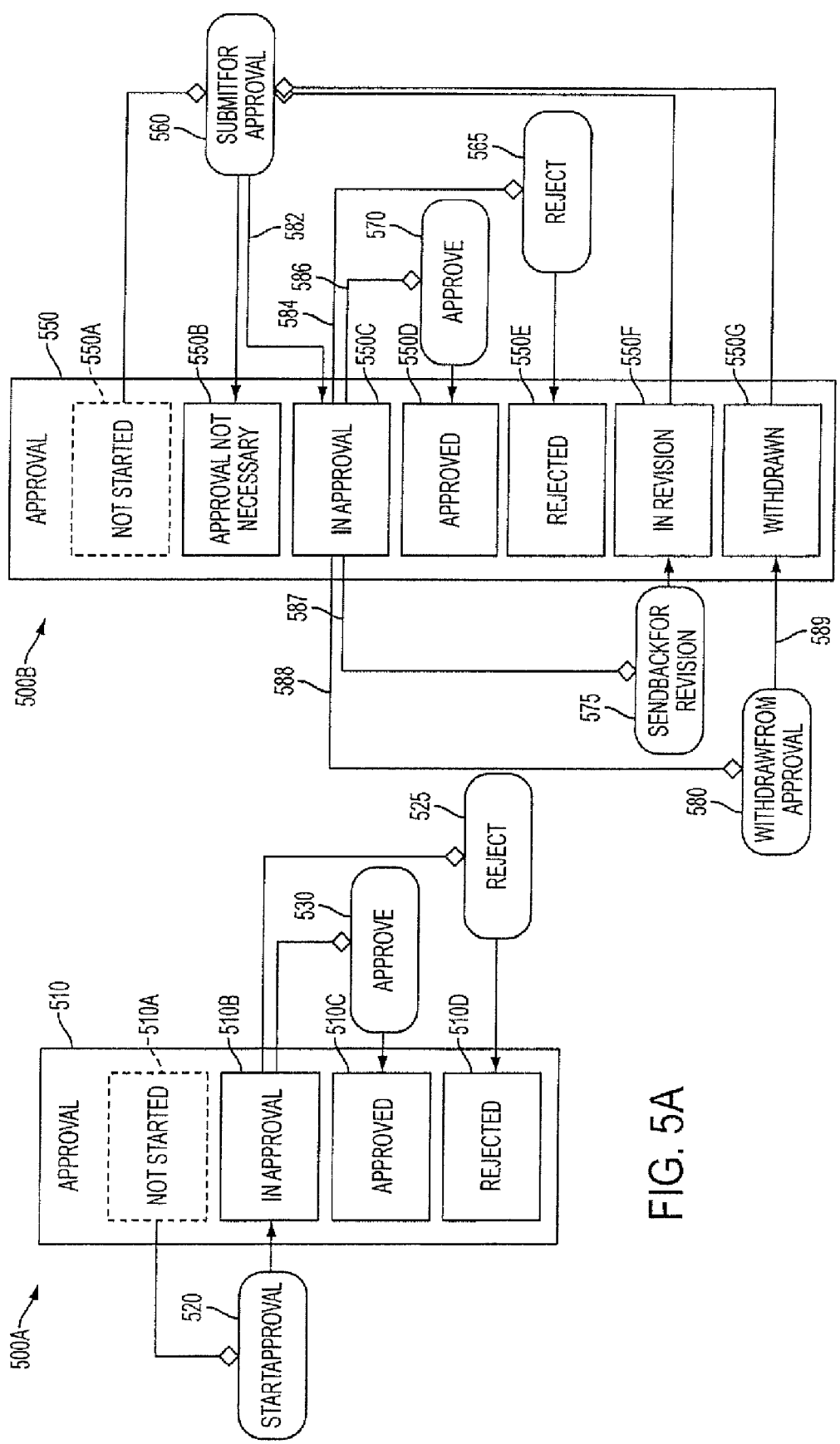
FIGS. 5A, 5B, 15, 16, 18 and 19 are block diagrams that depict examples of an approval status schema.

FIG. 5A depicts an example of an approval status schema 500A, which also may be referred to as an approval status schema model. The approval status schema model 500A may be defined and modified, using, for example, the modeling computer system 350 described previously with respect to FIG. 3. The approval status schema model 500A is a design-time model. Design-time status schema models may be used to show relations between an object's state and actions, which may define constraints for the actions by describing which actions are allowed for which status values, and define which status values are to be set after the completion of an action. At runtime, an approval status schema instance may be loaded, for example, from the runtime status repository 140 described previously with respect to FIG. 3, by the status management runtime component 130 with the current values of the status variables.

As illustrated, the approval status schema model 500A includes a single status variable 510 (shown as "Approval") with four possible status values 510A-510D (shown as "Not Started," "In Approval," "Approved" and "Rejected," respectively), and three actions 520, 525 and 530 (shown as "Start Approval," "Reject" and "Approve," respectively). The approval status schema model 500A may be instantiated with the initial value NOT STARTED 510A, as indicted by the dotted-line border. Approval of the action 520 (i.e., "Start Approval"), for example, causes the status value IN APPROVAL 510B to be set, which is a precondition of the REJECT action 525 and APPROVE action 530—that is, in this example, a "Reject" or an "Approve" action is not allowed unless the IN APPROVAL status value is currently set in the approval status variable 510.

As illustrated in this example, the modeled status variables and their status values represent the state of the object node. The status values represent the possible values a status variable is allowed to take up, while the status variable lists all possible allowed status values. At runtime, the status variable then specifics information about the currently valid value. The modeled actions represent the methods that may be performed on or by the object node. Whether they are allowed or not is dependent on the currently set status value associated with the object node's state. The modeled preconditions are identified by the connections (lines or edges) from status values to actions, and they represent the status value constraints allowing or permitting the actions. The modeled transitions are identified by the edges (or lines) that come out of an action and connect to a resulting status value, and they represent constraints allowing or permitting the setting of a status value following the performance of an action (for example, as triggered by an updating process). The model may also identify edges (or lines) drawn from one status value of one variable to another status value of another variable (not shown), indicating that one status change directly triggers another one. The status management runtime component 130 may adjust such other status information in the status repository 140 during application runtime when the data objects are processed.

FIG. 5B is another example of an approval status schema model 500B for a data object node. In one example, the approval status schema model 500B may correspond to a sales order node, such as sales order root 210 as described previously with respect to FIG. 2. In another example, the approval status schema model 500B may correspond to a sales order item, such as items 220A-220D as described previously with respect to FIG. 2. Associating the status schema model 500B with each item node (rather than the root node) provides a finer granularity of approval such that each item is approved separately (rather than the approval of the sales order as a whole).

The approval status schema model 500B (like the status schema model 500A) includes a single status variable 550 (shown as "Approval"). In contrast with model 500A, the approval status schema model 500B includes seven possible status values 550A-550G (shown as "Not Started," "Approval Not Necessary," "In Approval," "Approved," "Rejected," "In Revision" and "Withdrawn"), and seven possible actions 560, 565, 570, 575 and 580 (shown as "Submit For Approval," "Reject," "Approve," "Send Back For Revision," and "Withdraw From Approval," respectively). As illustrated, the approval status schema model 500B is instantiated with the initial value NOT STARTED 550A, as indicted by the dotted-line border. As illustrated, if the submit-for-approval action 560 is performed, the status value of the approval status variable 550 changes from a NOT STARTED value 550A to the IN APPROVAL value 550C, as illustrated by the edge 582 leading from the submit-for-approval action 560. The status value IN APPROVAL 550C must be set for any of the reject action 565, the approval action 570, the send-back-for-revision action 575 or the withdraw-from-approval action 580 to be performed. These preconditions for the actions 565, 570, 575 and 580 are shown by the edges 584, 586, 587 and 588 leading from the status value IN APPROVAL 550C to each of the actions 565, 570, 575 and 580. Performing any one of the reject action 565, the approve action 570, the send-back-for-revision action 575 or the withdraw-from-approval action 580 changes the status value of the approval status variable 550, which, in turn, makes the these actions 565, 570, 575 and 580 unavailable to be performed.

As illustrated, the edges (or lines) that lead into an action are preconditions that define which status values enable an action to be performed. One example of a precondition edge is edge 584 leading from the value IN APPROVAL 550C to the reject action 565. The edges (or lines) that lead from an action reflect a status transition—that is, a transformation of a status value of a status variable to another status value of the status variable. An example of a status transition is edge 589 leading from the withdraw-from-approval action 580 to the value WITHDRAWN 550G of the approval status variable 550. An edge (or line) may be drawn from a status value of one status variable to a status value of another status variable, which illustrates a status change that triggers another status change. A status change that triggers another status change may be referred to a "synchronizer."

In this example of status schema model 550, performing the submit-for-approval action 560 causes the value IN APPROVAL 550C to be set, which is a precondition of the reject action 565, approve action 570, the send-back-for-revision action 575 and the withdraw-from-approval action 580.

In comparison with status schema model 500A, status schema model 500B provides additional options during an approval process—for example, the send-back-for-revision action 575 and withdraw-from-approval action 580. The additional status value IN REVISION 550F and status value WITHDRAWN 550G of the approval status variable 550 support the more robust approval process. As would be understood by a person skilled in the art, the inclusion of more actions and predetermined status values for the approval status variable 550 in status schema model 550B does not intrinsically make this status schema model 550B preferred over the status schema model 550A. Rather, the ability to more accurately model a "real-world" business process is important—whether the "real-world" business process is more accurately represented by status schema model 500A or more accurately represented by status schema model 500B. The ability to model a business process by adding actions and status values for a status variable representing a step in business process is beneficial.

Figure 6:
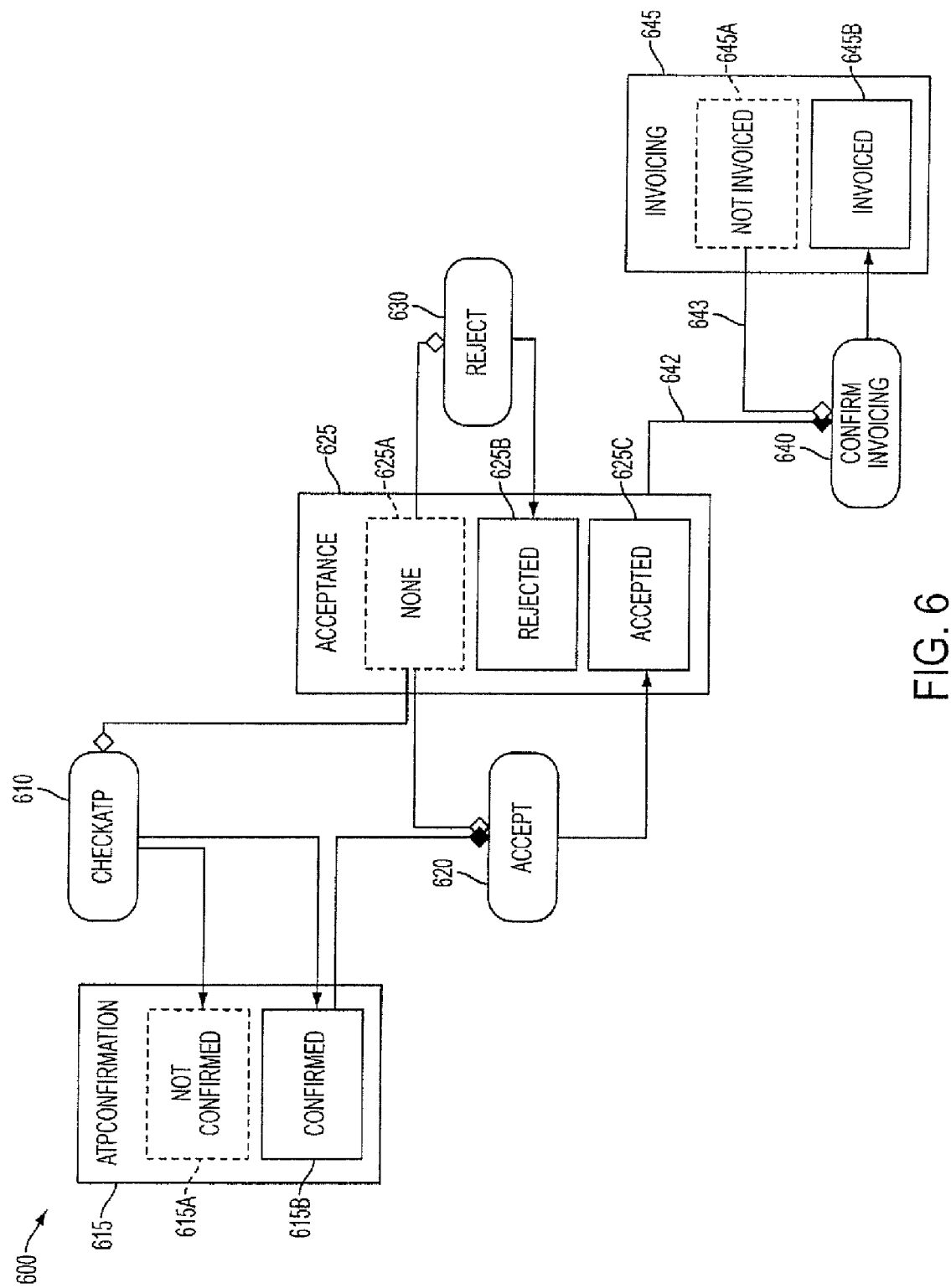
FIG. 6 is a block diagram of an example status schema model for a sales order object node.

FIG. 6 illustrates an example status schema'model 600 for a sales order object node. The status schema model 600 includes a check-availability action 610 (shown as "Check-ATP"), an accept action 620, a reject action 630 and a confirm-invoicing action 640. The status schema model 600 also includes an availability-confirmation status variable 615 (shown as "ATPConfirmation") having an initial status value 615A of NOT CONFIRMED and a CONFIRMED status value 615B. The status schema model 600 also has an acceptance status variable 625 having an initial value 625A of NONE, a status value 625B of REJECTED, and a status value of ACCEPTED 625C. The status schema model 600 further includes an invoicing status variable 645 having an initial status value 645A of NOT INVOICED and a status value 645B of invoiced.

In the example of status schema model 600, the confirm-invoicing action 640 should be performed only if an associated order has been accepted and an invoice has not been yet sent out. That is, the confirm-invoice action 640 is permitted to be performed only if the current value of the invoicing status variable 645 is the status value NOT INVOICED 645A and the current value of the acceptance status variable 625 is the status value ACCEPTED 625C. The model 600 reflects these preconditions of the confirm-invoice action 640, as shown by the edge 642 leading from the status value ACCEPTED 625C of the acceptance status variable 625 to the confirm-invoicing action 640 and by the edge 643 leading from the value NOT INVOICED 645A of the invoicing status variable 645 to the confirm-invoicing action 640.

Figure 7:
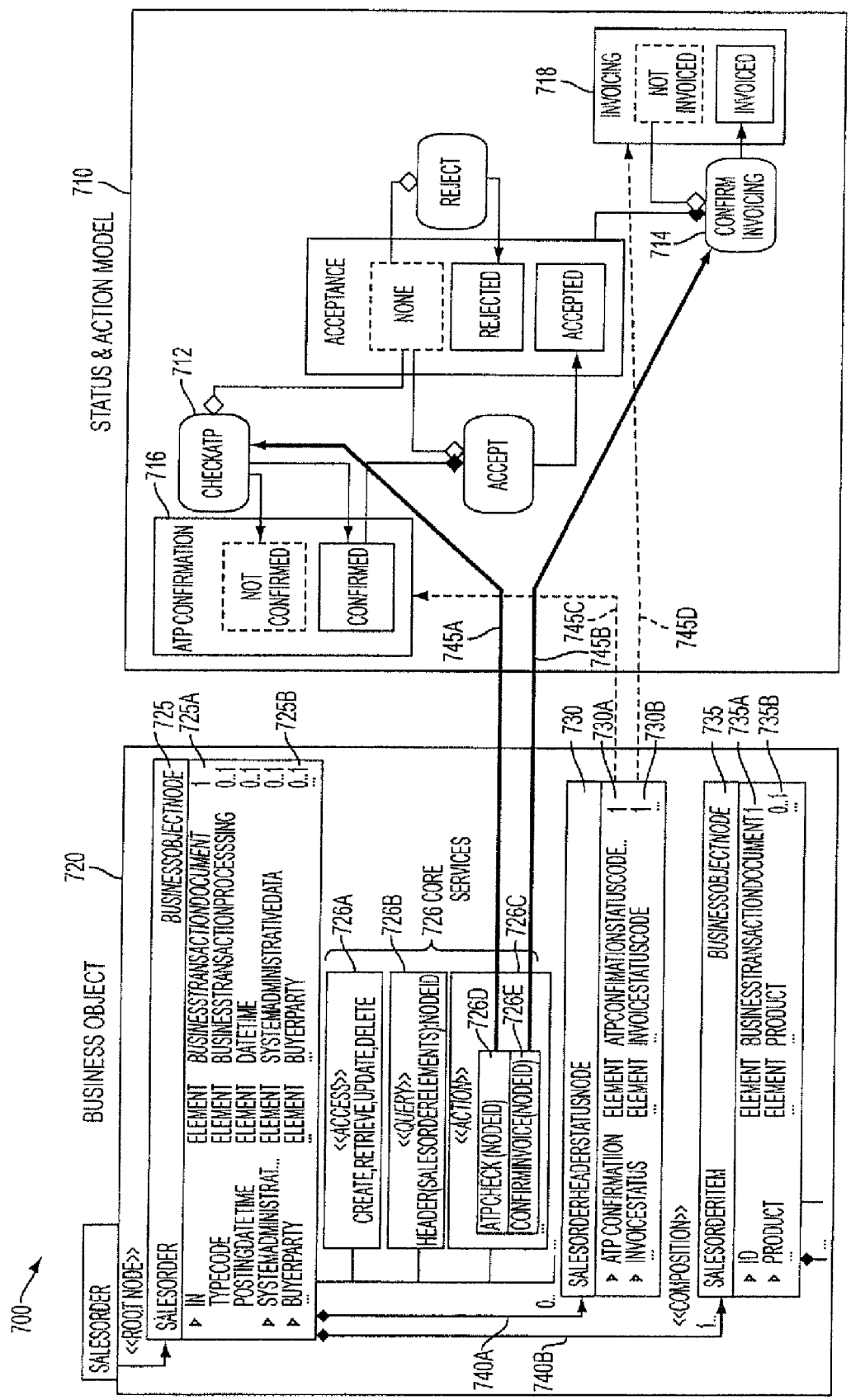
FIG. 7 is a block diagram of an architecture that includes a status and action model and a business object model.

FIG. 7 shows an architecture 700 that includes a status and action model 710 and a business object model 720, which may be a type of a data object model. In this example, the business object model 720 represents a design-time sales order object model. The business object model 720 is another example of how a sales order object may be modeled. Like the sales order modeled in FIG. 2, the sales order business object model 720 includes a business object node 725 (called "SalesOrder" and may also be referred to as a sales object node or a sales object root node). The sales object node 725 also includes a header status node 730 (called "SalesOrder HeaderStatusNode" and may be referred to as a sales status node), and, like the sales order of FIG. 2, an item node 735 (called "SalesOrderItem"). The sales object node 725 is the root node of a sales order object and includes identifying information, such as an identifier variable 725A (called "ID"), a customer identifier 725B (called "BuyerParty") as well as other variables. The sales object node 725 provides a set of core services 726, including access methods 726A, a query method 726B, and actions 726C. The actions 726C of the sales object node 725 include an availability-check action 726D (called "ATPCheck") and an confirm-invoice action 726E.

As shown through line 740A, the sales object node 725 is related to the sales status node 730, which includes an availability status variable 730A (called "ATPConfirmation") and an invoice status variable 730B (called "InvoiceStatus").

As shown through line 740B, the sales object node 725 also is related to one or more sales order item nodes 735, each of which include an identifier variable 735A, a product identifier variable 735B as well as other variables related to a sales item (not shown). The sales object node 725 may be one example of a design-time data object node model for the runtime sales item instances 220A-220D, which have been described previously with respect to FIG. 2.

The status and action model 710 may be an implementation of the status and action model 600 described previously with respect to FIG. 6. The status and action model 710 and the business object model 720 are related through actions and status variables. More particularly, in this example, the availability-check action 726D of the sales order node 725 corresponds to the check-availability action 712 in the status and action model 710, as shown through arrow 745A. The confirm-invoice action 726E of the sales order node 725 corresponds to the confirm-invoicing action 714 of the status and action model 710, as shown through arrow 745B. The availability-confirmation status variable 730A of the sales status node 730 corresponds to the availability-confirmation status variable 716 of the status and action model 710, as shown through dotted arrow 745C. The confirm-invoice status variable 730B of the sales status node 730 corresponds to the invoicing status variable 718 of the status and action model 710, as shown through dotted arrow 745D.

Figure 8:
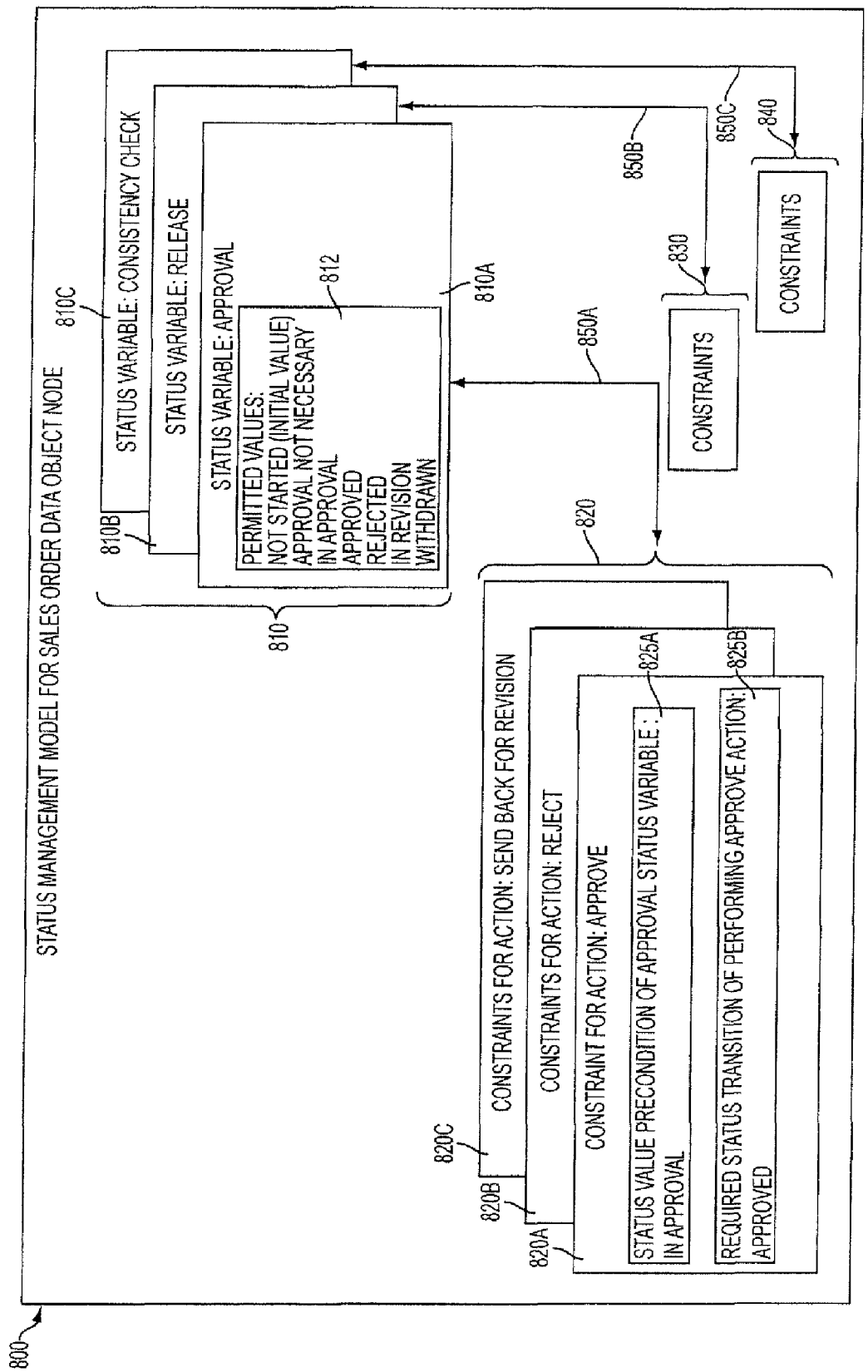
FIG. 8 is a block diagram of a conceptualized data structure of a status schema model.

FIG. 8 shows a conceptualized data structure 800, in simplified form, for a status schema model that relates status variables 810 to constraints 820, 830 and 840 for actions that may be performed on a sales order node. The data structure 800 includes three status variables: approval 810A, release 810B and consistency check 810C. The data structure 800 also identifies the status values that may be set for each status variable, as shown by values 812 for the status variable approval 810A.

In the example data structure 800, each status variable for the sales order node is related to one or more constraints for an action that may be performed by the sales order node. More particularly, constraints 820 for actions 820A, 820B and 820C are based on the current value of the approval status variable, as shown by line 850A. In particular, constraints for approve action 820A identifies a precondition 825A for the approval action (here, IN APPROVAL status value) to be permitted and a status transition 825B (to APPROVED status value) that results from occurrence of the approve action 820A. Constraints for the reject action 820B and constraints for the send-back-for-revision action 820C identify one or more preconditions (based on the approval status variable) for the action to occur and optionally may identify a status transition resulting from the action. Stylized constraints 830 identify constraints for actions based on the release status variable 810B, as represented by line 850B, whereas stylized constraints 840 identify constraints for actions based on the consistent-check status variable 810C, as represented by line 850C. The data structures of constraints 830 and 840 are structured in a similar way to the constraints 820.

Figure 9:
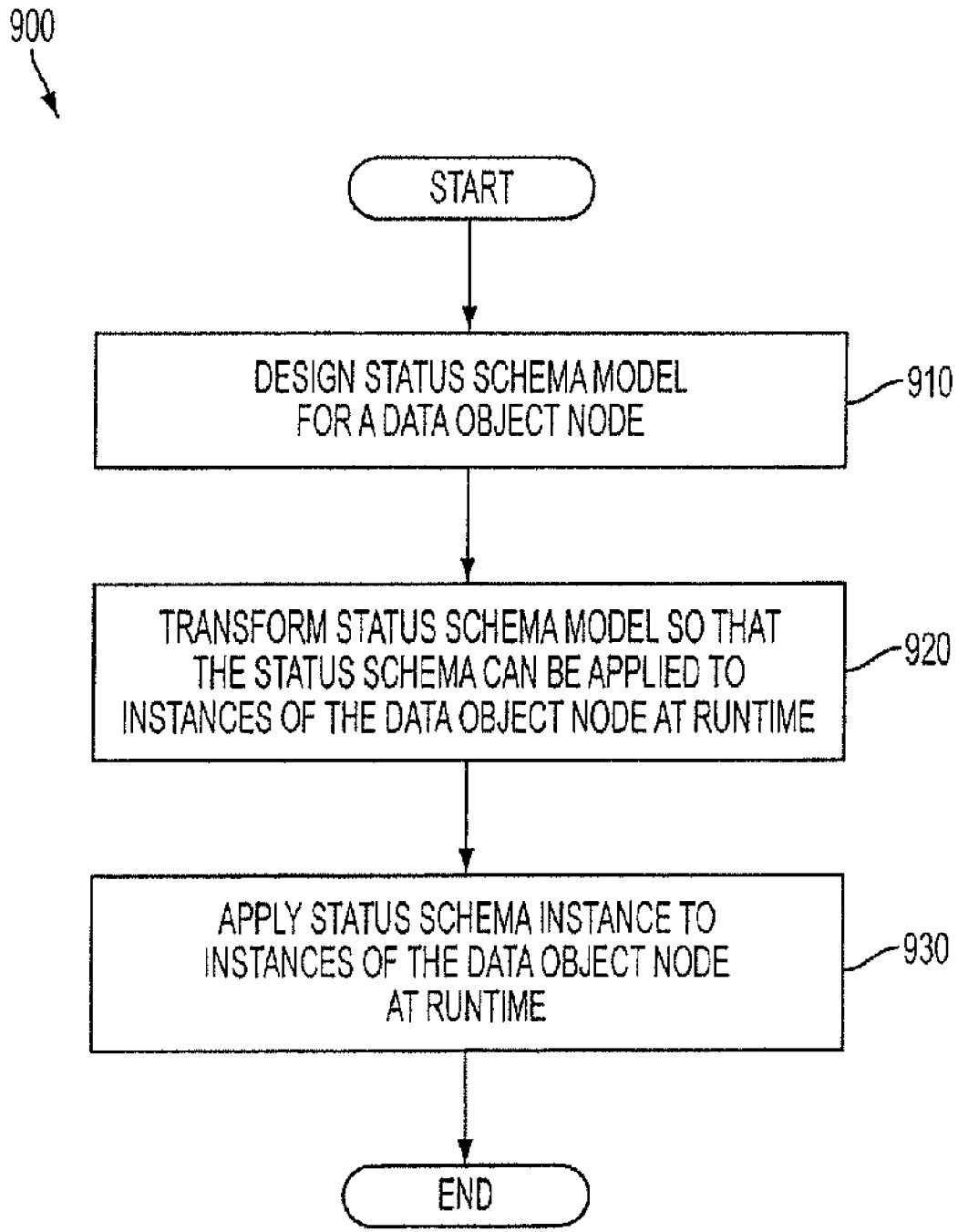
FIG. 9 is a flow chart of an example process for designing and using a status schema model.

FIG. 9 shows an example process 900 for designing and using a status schema model. The process 900 may be performed, for example, using the modeling computer system 350 and the processing computer system 110, both as described previously with respect to FIG. 3.

The process 900 includes designing a status schema model for a data object node (step 910). This step may be performed, for example, by a user of the modeling computer system 350 executing a computer program presenting graphical user interface to create and modify a status schema model. For example, a user in one or more sessions may use a graphical user interface to design, simulate and refine a status management model for a data object node, such as status and action schema models 500A, 500B and 600 of FIGS. 5A, 5B and 6, respectively.

Once designed, the status schema model is transformed such that the status schema can be applied to instances of the data object node at runtime (step 920). For example, the status schema model may be reformatted for efficient runtime access by an application runtime component or status management runtime component, as described previously with respect to FIGS. 1 and 3. The status schema model may be persistently stored, such as in a runtime status repository 140 of FIG. 1 or 3.

During runtime, the status schema instance is applied to instances of the data object node to enforce the status and action constraints specified by the status schema model. One of the advantages of this process is that the status schema model created (and refined) in step 910 is used to enforce the status and action constraints in step 930. As such, a visible status-driven process may be defined and consistently applied to data objects. While the model is transformed for use at runtime, the semantic information of the status schema model is not changed in the transformation. The status and action constraints specified by the status schema model for a data object node are applied without deviation at runtime to instances of the data object node.

In some implementations, multiple status schema models may be created for a data object node. In such a case, at runtime, one of the multiple status schema models is applied without deviation to instances of the data object node.

Figure 10:
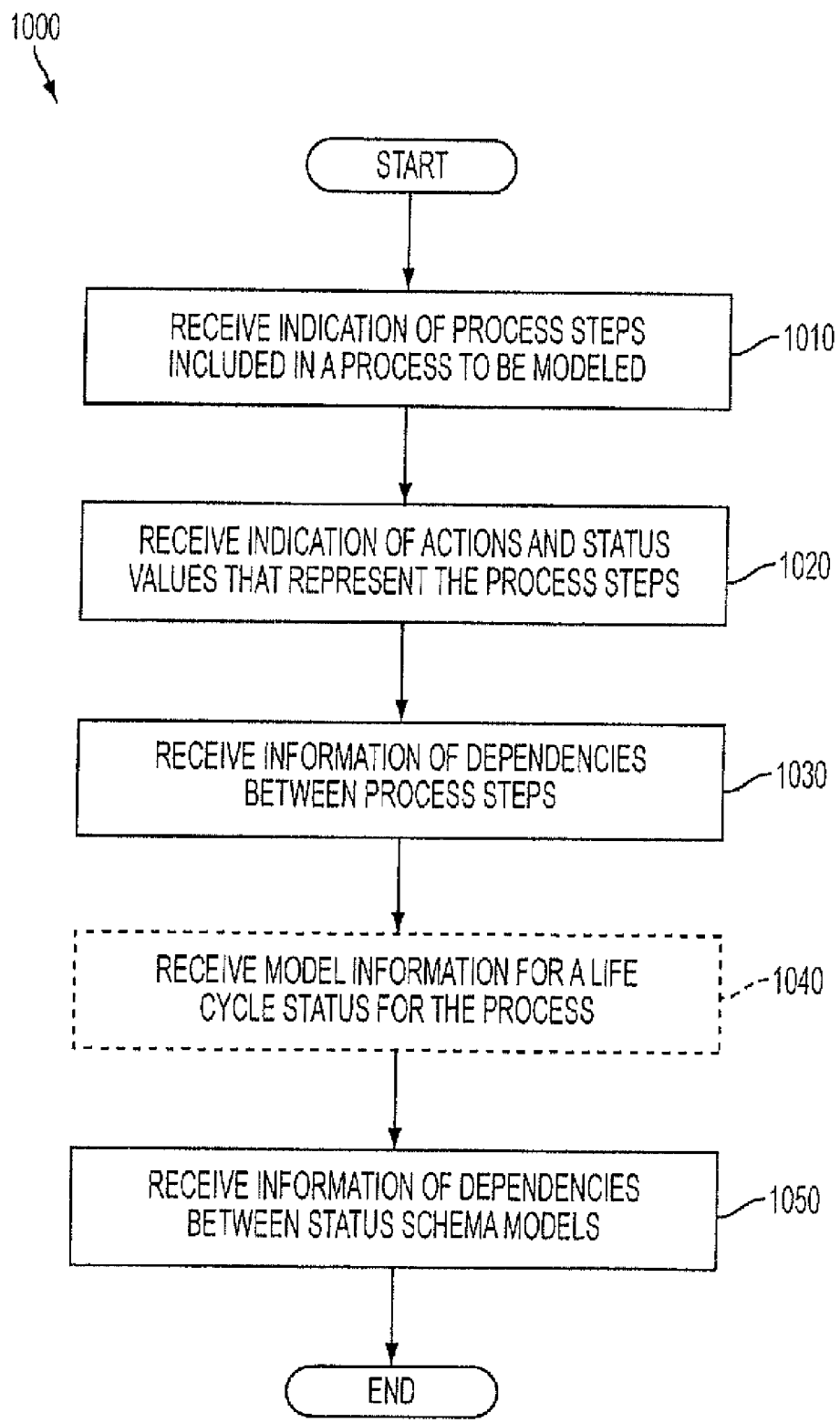
FIG. 10 is a flow chart of an example process for modeling a process in a status and action modeling computer system.

FIG. 10 illustrates an example process 1000 for modeling a process in a status and action modeling computer system. In one example, the process may be implemented by the modeling computer system 350 described previously with respect to FIG. 3. For example, computer-readable medium may be configured to perform the process 1000 when executing on a processor (or processors) of a modeling computer system.

The process 1000 begins with the receipt of an indication of the process steps to be included in a process to be modeled (step 1010). In one example, processing a sales order includes three processing steps: (1) availability check for items in the sales order to determine whether the sales order can be fulfilled, (2) communication to the buyer of acceptance (or rejection) of the sales order by the seller, and (3) creating an invoice to send to the buyer for accepted an sales order.

An indication of actions and status values that are important to, or represent, the process steps are received (step 1020). Continuing the example, the availability process step includes a check-availability action; the acceptance process step includes an accept action and a reject action; and the invoicing process step includes a confirm-invoicing action. The progress of the process steps is reflected in a status variable. In this simplified example, the availability process step includes a confirm-availability status variable having NOT-CONFIRMED and CONFIRMED status values; the acceptance process step includes an acceptance variable having NONE, REJECTED and ACCEPTED status values, and the invoicing process step includes an invoicing status variable with NOT-INVOICED and INVOICED status values. As illustrated in this example, each action associated with a process step is represented by a status value corresponding to the action. In particular, the acceptance process step has a reject action and an accept action, each of which are reflected in permitted status values for the acceptance status variable.

Information of dependencies between process steps is received (step 1030). Sometimes process steps cannot occur in parallel, and information related to the constraints between the process steps is received to be modeled. Continuing the example, a sales order can only be accepted if the availability check was successful; invoicing only occurs if the sales order was accepted; and checking availability should not be performed after the order was accepted or rejected. Stated differently, information is received that defines the preconditions and status transitions depicted model 600 described previously with respect to FIG. 6.

In some implementations, model information for a life cycle (or overall) status for the process may be received (step 1040). For example, an overall status variable that reflects the overall process stage may be defined. Continuing this example, information may be received that indicates that the process should have a life cycle status variable with possible status values of IN PREPARATION, IN ACCEPTANCE, IN EXECUTION, COMPLETED and REJECTED.

As such, the process 1000 represent an example implementation of defining a status schema model for a sales order object node. The status schema model for the data object node generally is stored in the modeling computer system for review and refinement.

In some implementations, the process 900 may include receipt of information of dependencies between status schema models (step 1050). For example, information may be received that is related to inter-schema processes, such as population and aggregation derivations, described previously with respect to FIG. 3.

Figure 11:
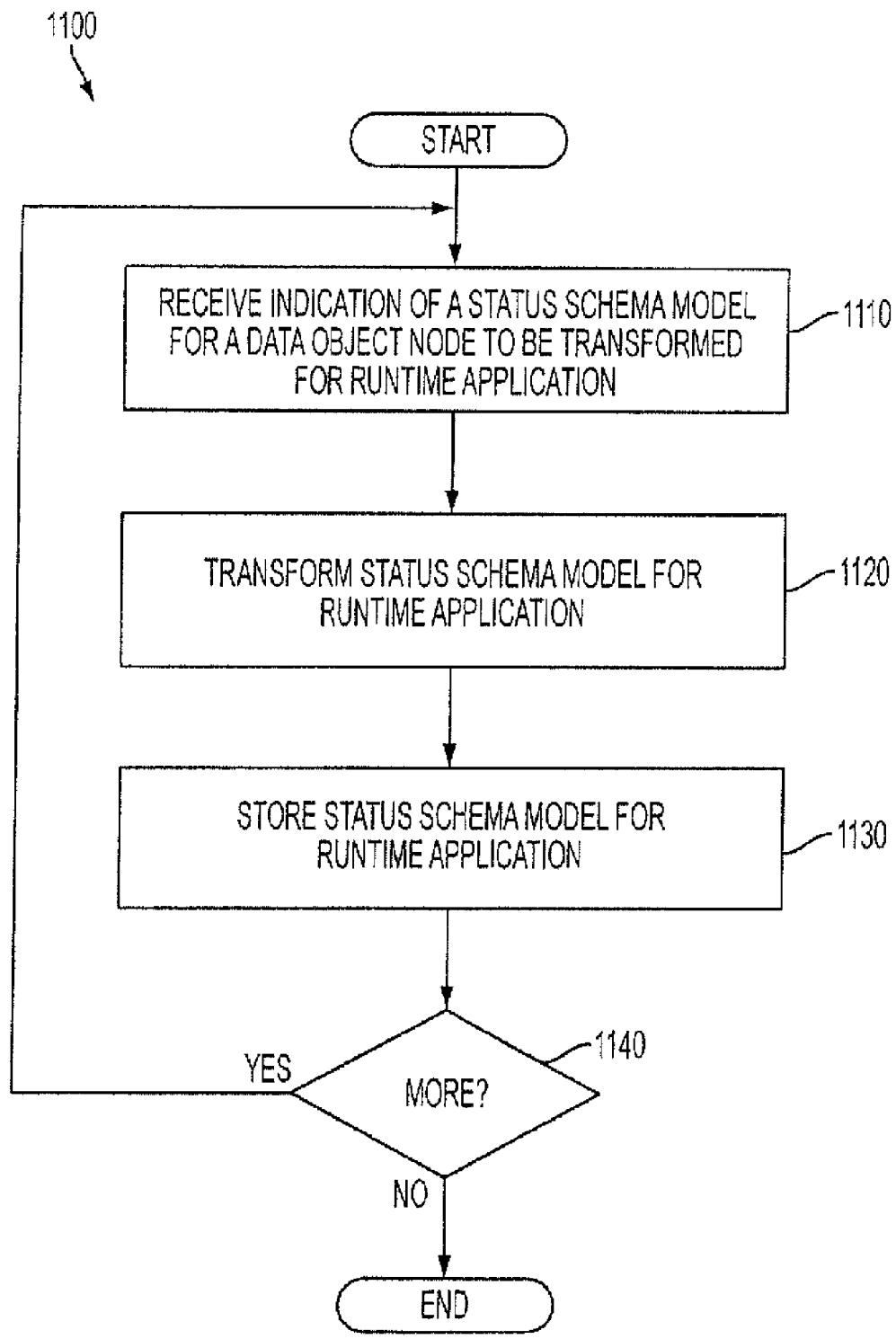
FIG. 11 is a flow chart of an example process for transforming a status schema model for application to runtime instances of a data object node.

FIG. 11 shows an example process 1100 for transforming a status schema model for application to runtime instances of a data object node, which corresponds to a status schema model. The example process 1100 may be an implementation of the transformation step 920 described previously with respect to FIG. 9. The process 1100 may be implemented by the modeling computer system 350 described previously with respect to FIG. 3.

The process 1100 begins with the receipt of an indication of a status schema model for a data object node (step 1110). The status schema model transformed by performing the process 1100 to a runtime representation of the status schema model. In one example, a user of a modeling computer system may select one of previously defined status schema models from a displayed list. In another example, the user may enter an identifier of a particular status schema model. In yet another example, the transformation process 1100 may be performed sequentially to, or as part of, a process to design a status schema model for a data object node. In such a case, for example, the indication may be programmatically received by the processor executing the process 1100.

The status schema model for the data object node is transformed (step 1120) and stored for runtime use (step 1130). For example, the status schema model may be transformed from a modeling format to a format usable by a runtime component, such as the runtime processing component 120 or the status management runtime component 130, described previously with respect to FIG. 1. The transformed status schema model may be stored, for example, in a runtime status repository, which may be an implementation of repository 140 described previously with respect to FIG. 1 or 3. In some implementations, additional status schema models may be identified for transformation and storage (step 1140).

Figure 12:
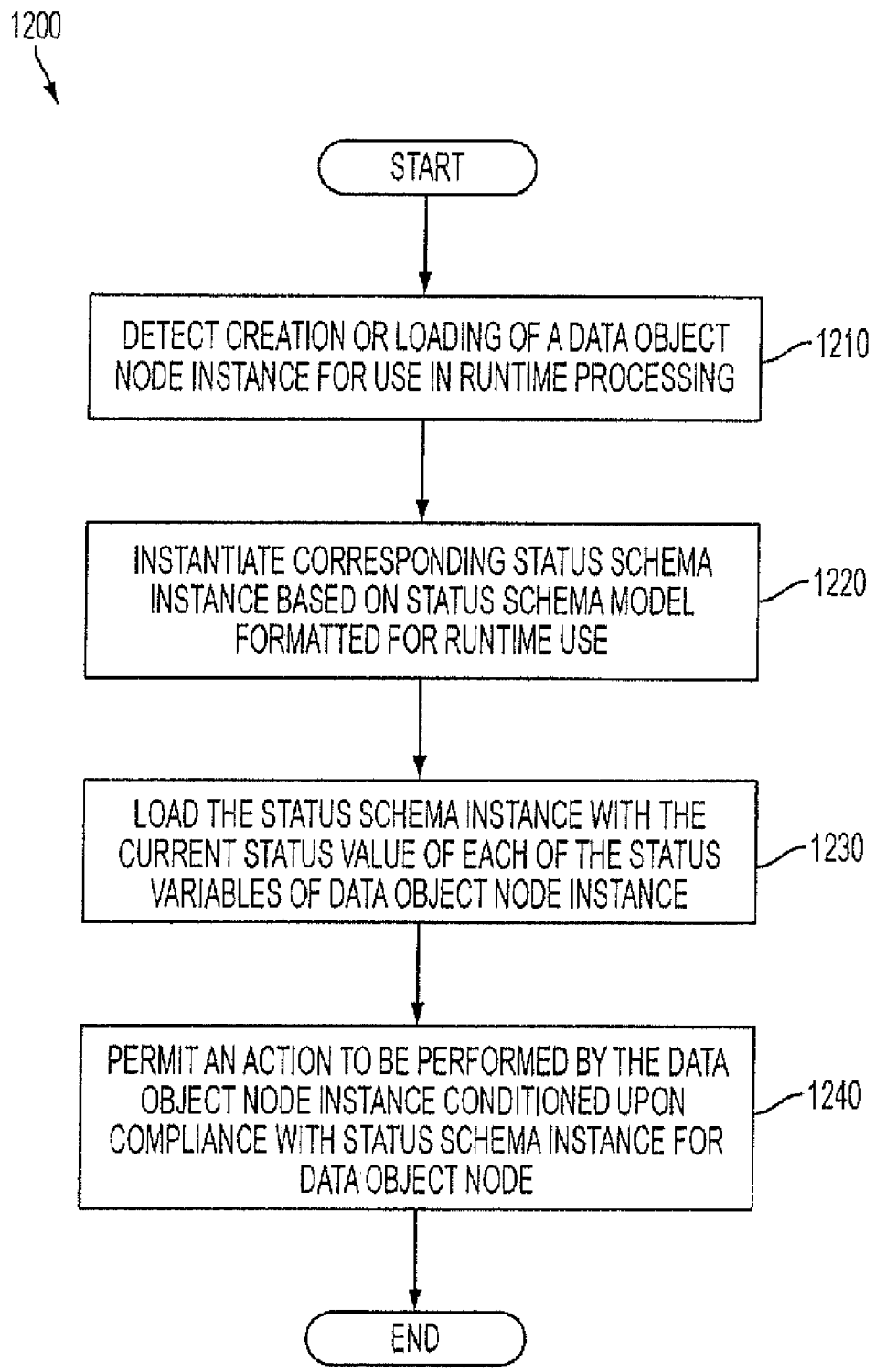
FIG. 12 is a flow chart of an example process for applying a status schema model to an instance of a corresponding data object node instance.

FIG. 12 illustrates an example process 1200 for applying a status schema model to an instance of a corresponding data object node instance. The example process 1200 may be an implementation of the application step 930 described previously with respect to FIG. 9. The process may be implemented in computer-readable medium that is executed by, for example, a processor of the processing computer system 110 described previously with respect to FIG. 3.

The process 1200 begins when the processor implementing the process 1200 detects creation of a data object node instance or detects loading of a previously created data object node instance (step 1210). The processor instantiates (or creates) a status schema instance corresponding to the status schema model for the data object node of the same type as the detected data object node instance (step 1220). For example, a sales order node instance is created by a processing computer system in response to a sales order being placed by a customer. A status schema model for a sales order node is accessed, for example, from the runtime status repository 140 described previously with respect to FIGS. 1 and 3. The status schema model for a sales order node is used to create an instance of the sales order node status schema.

The processor loads the status schema instance with the current status value of each of the status variables of the data object node instance (step 1230). Continuing the example, the status variables in the instance sales order status schema are set to the same status values of corresponding status variables in the sales order node instance. When the creation of sales order node instance is detected in step 1210, the instance of the sales order node status schema includes the default status values for the status variables.

The processor permits an action to be performed by the data object node instance conditioned upon compliance with the status schema instance for the data object node (step 1240). For example, the processor may determine whether an action may be performed by the sales object node instance by evaluating preconditions included in the sales order node status schema instance.

Figure 13:
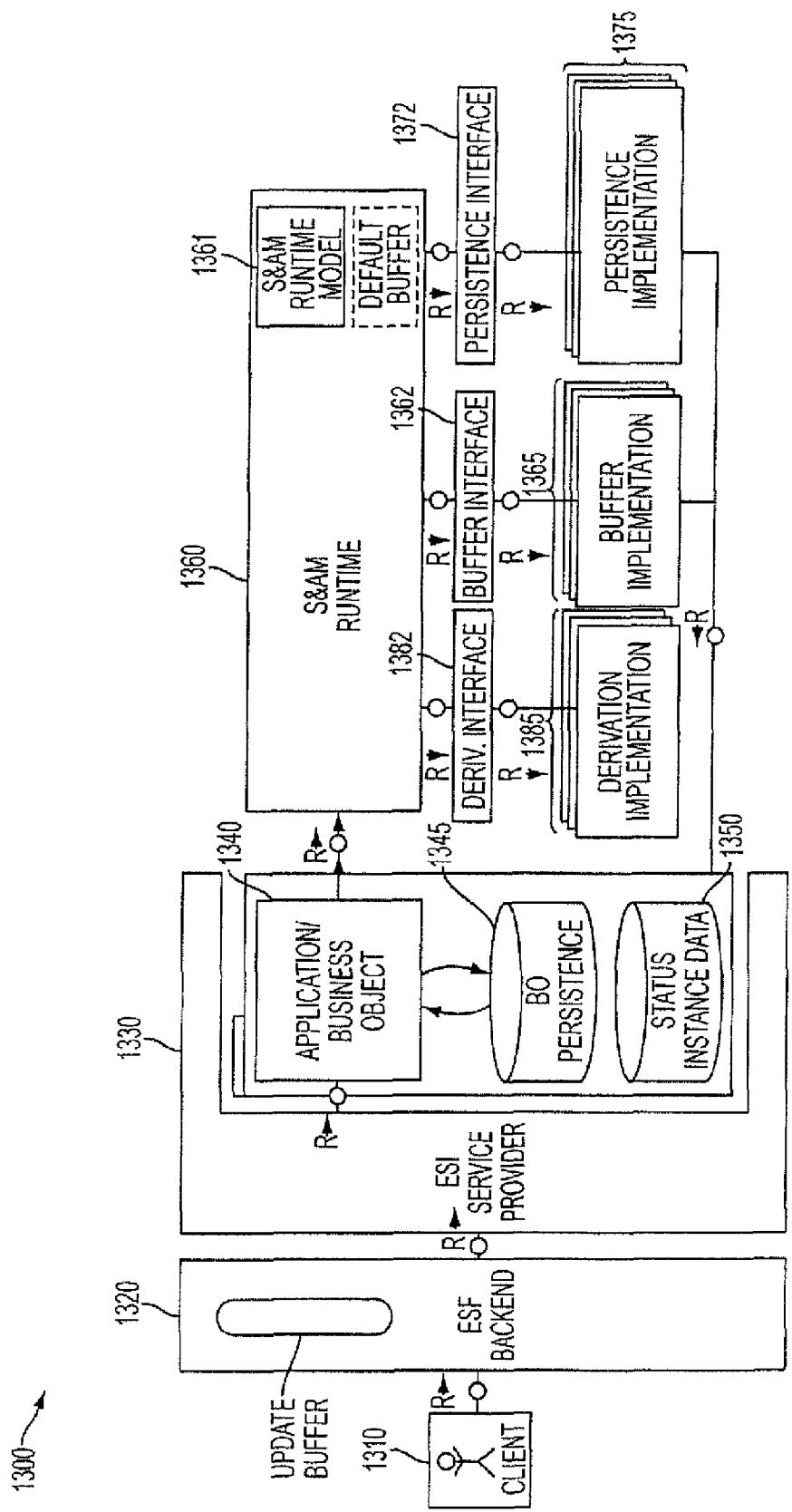
FIG. 13 is a block diagram of an example runtime architecture for status management.

FIG. 13 depicts an example of a runtime architecture 1300 for status management within an enterprise services implementation. In general, the runtime architecture 1300 includes an enterprise services layer, an application layer, and a status management runtime layer. The entities in the status schemas correspond to external representations in the enterprise services layer. The application layer implements the services modeled in the enterprise services layer. To perform tasks related to status information (such as checking whether an action is allowed and setting a status value as a result of performing an action), the application layer uses the status and action management (S&AM) runtime component. The application layer also provides services to the status and action management runtime component, such as performing a process to determine status derivations or other inter-schema processes.

More particularly, a client 1310 accesses enterprise services externally provided to clients, which communicate with the enterprise services framework backend 1320, which, in turn, interfaces with the enterprise services provider interface 1330. The enterprise services provider interface 1330 addresses an application through application/business object 1340. The application layer also includes a repository of persisted business object instances 1345 and optionally a status instance data repository 1350. In some implementations, the business object instances include status variables, which are used to set status values in corresponding variables of status schema instances. Additionally or alternatively, an application layer may store status variables for business objects separately, for example, in a status instance data repository 1350. At runtime, the status schema instance is instantiated and status values set based on the current status values of status variables, whether the status variables are persistently stored with business objects or in a separate status repository. In some implementations, a status schema instance for a data node instance may be persistently stored and loaded into memory at runtime.

The application/business object 1340 accesses the status and action management runtime component 1360, which includes the status and action management runtime model 1361 having status schema models usable at runtime. The status and action management runtime component 1360 includes a buffer interface 1362 to a buffer implementation 1365, which is a runtime representation of status schema instances. The status and action management runtime component 1360 also includes a persistence interface 1372 to a persistence implementation 1375 of status schema instances. The persistence implementation 1375, for example, may map status tables (such as name-value pair tables) of the status and action management runtime component 1360 to the database tables of the application data. The status and action management runtime component 1360 optionally may include a derivation interface 1382 to a derivation implementation 1385. The derivation interface 1382 provides a standardized manner for the runtime to access derivation processes, or other types of inter-schema processes.

Figure 14:
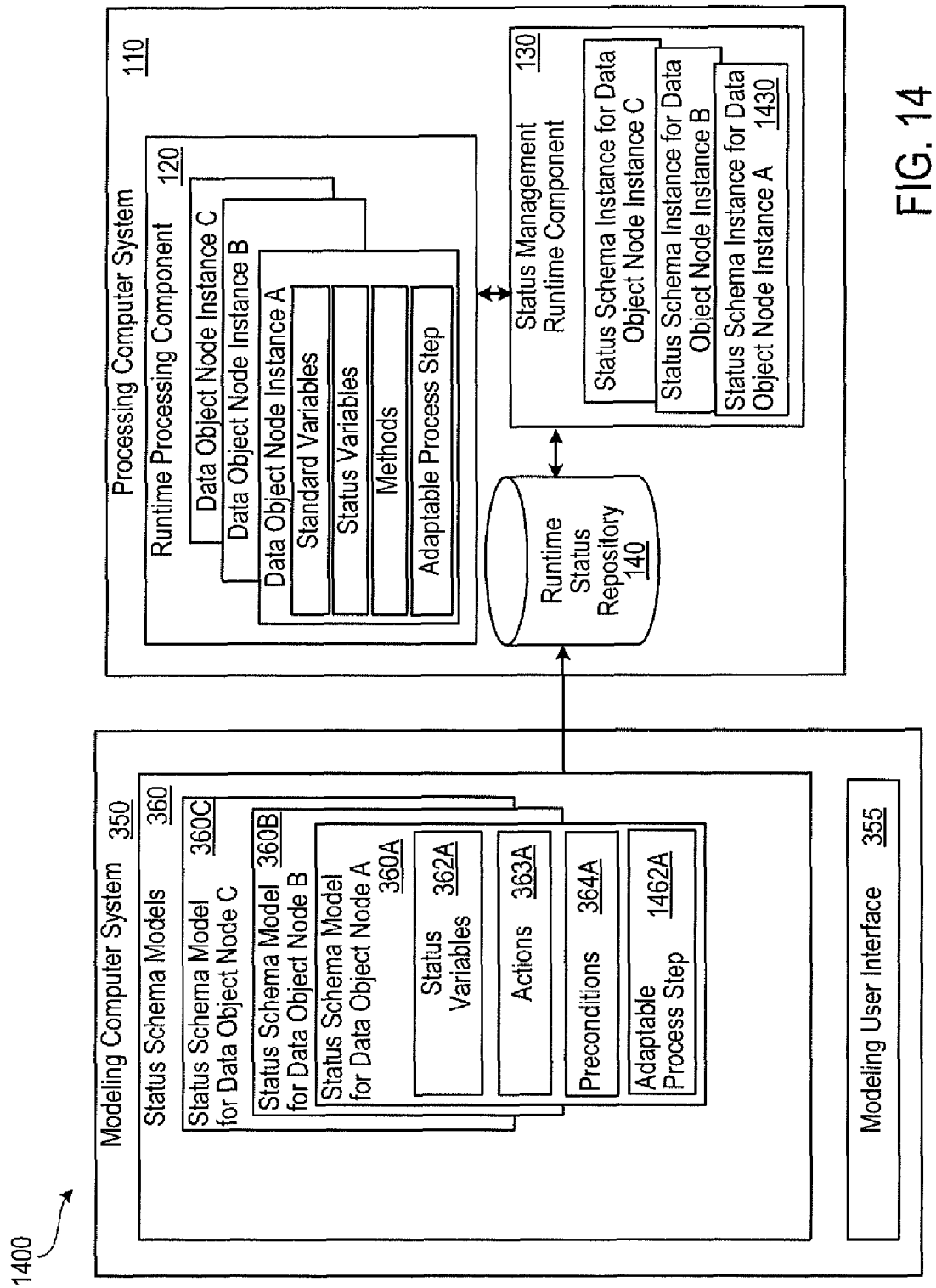

FIG. 14 illustrates a computer system 1400 that uses a constraint-based model to control data processing where the constraint-based model includes a modeling element corresponding to a process step for a business process involving the data object node instance where the process step may be active or inactive at runtime. Such a process step also may be referred to as an adaptable process step. A modeling element for an adaptable process step is a container for other modeling elements. Preconditions belonging to the adaptable process step are only evaluated if the adaptable process step is active at runtime. Actions that belong to the adaptable process step are inhibited if the adaptable process step is inactive. Status variables that belong to the adaptable process step are disabled and have no well-defined value if the adaptable process step is inactive. An adaptable process step that is active may be referred to as switched on, and an adaptable process step that is inactive may be referred to as switched off. In some implementations, for example, a switch may be used at runtime to activate the process step. A switch may be, for example, a method of a data object node that switches on or off the adaptable process step for the data object node conditioned on the status of the data object node. Such a switch, for example, may be exposed as a service to other data object nodes, as a service may be exposed as callable by another data object node. Additionally or alternatively, a switch may be a method of a data object node that is not exposed as a service callable from outside the data object node.

More particularly, the system 1400, like the system 300 of networked computers described previously with respect to FIG. 3, is a system of networked computers and includes a processing computer system 110, a runtime processing component 120, a status management runtime component 130, and a status repository 140. Also like the system 300 described previously with respect to FIG. 3, the system 1400 also includes a modeling computer system 350 capable of generating and presenting on a display device (or devices) a modeling user interface 355 for defining status schema models 360 for data object nodes.

In contrast to the system 300 described previously with respect to FIG. 3, the system 1400 includes status schema models 360 that can include an adaptable process step. In the example system 1400, the status schema model 360A for data object node A includes an adaptable process step 1462A (in addition to status variables 362A, actions 363A and preconditions 364A modeling elements). Stated differently, one of the status schema models includes a modeling element that represents a process step that models a process step that may occur for business processes involving a data object node A. The modeled element may be referred to as an adaptable process step because the process step may occur within a business process involving the data object node A depending on the state of the instance of data object node A being processed at runtime, as described more fully below.

Also in contrast with the example system 300 described previously with respect to FIG. 3, in the example system 1400, the status schema instance for data object node instance A 1430 includes an adaptable process step that corresponds to the adaptable process step 1462A in the status schema model for the data object node A 360A. As illustrated in the example system 300, the data object node instance A includes an adaptable process step that corresponds to the adaptable process step 1462A in the status schema model 360A.

Figure 15:
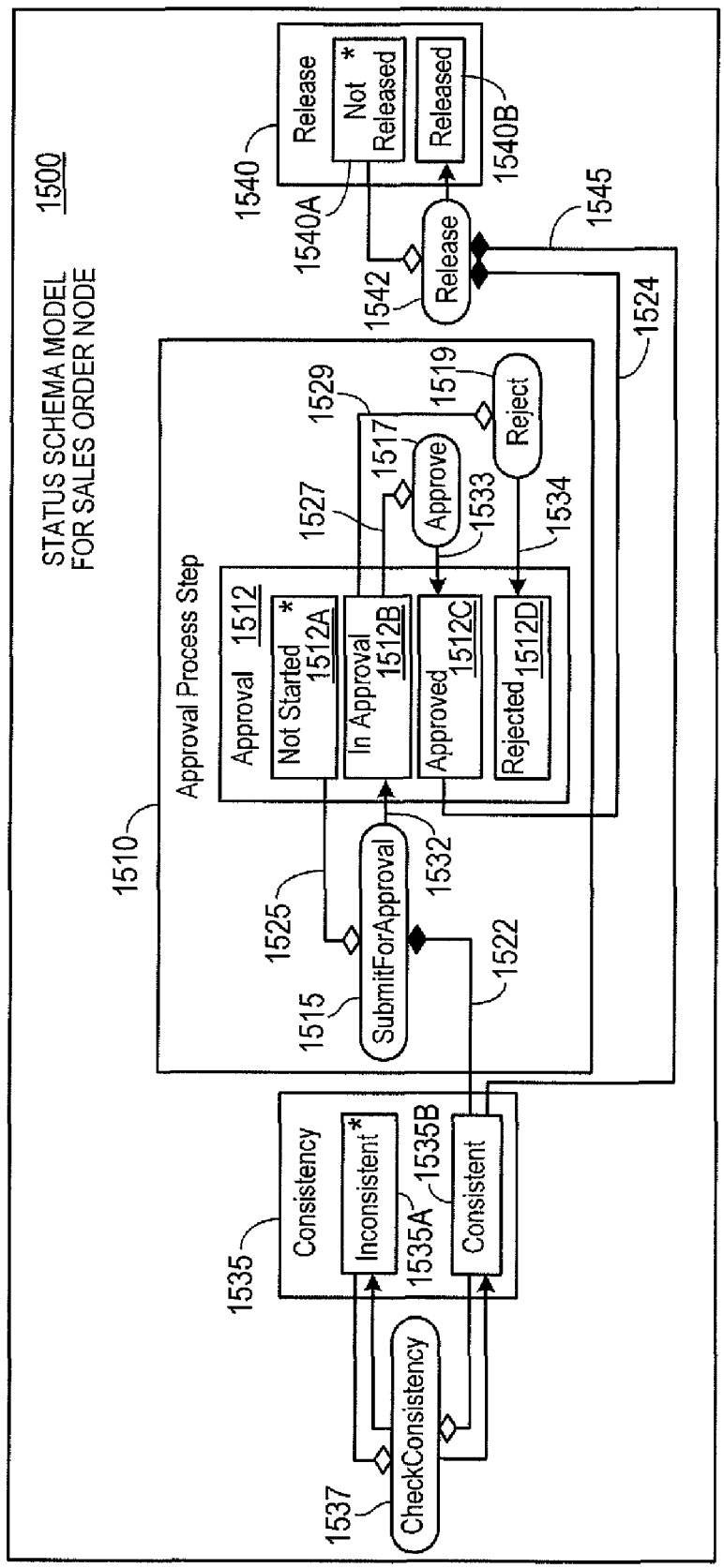

FIG. 15 illustrates an example status schema model 1500 for a sales order object node. In contrast to the example status schema model 600 for a sales order object node described previously with respect to FIG. 6, the example status schema model 1500 includes an adaptable process step 1510 modeling element (in addition to other modeling element types, for example, status variables, actions and preconditions). In the example of status schema model 1500, an approval is modeled as an adaptable process step 1510, though an adaptable process step need not necessarily involve an approval process. The adaptable process step 1510 includes an approval status variable 1512 having permitted status values of NOT STARTED 1512A, IN APPROVAL 1512B, APPROVED 1512C and REJECTED 1512D. The adaptable process step 1510 also includes a submit-for-approval action 1515, an approve action 1517, and a reject action 1519. The adaptable process step 1510 further includes precondition indicators 1522, 1524, 1525, 1527 and 1529, as well as status transitions 1532, 1533 and 1534.

As noted above, the approval process step 1510 is an adaptable process step that can be switched on or off (which also may be referred to as active or inactive, or activated or inactivated, respectively)—that is, the approval process step 1510 is included or not included in the process for a particular data object node instance according to the state of the data object node instance.

In addition to the approval process step 1510, the status schema model 1500 also includes a consistency status variable 1535, which is permitted to have status values of INCONSISTENT 1535A and CONSISTENT 1535B, and a release status variable 1540, which is permitted to have status values of NOT RELEASED 1540A and RELEASED 1540B.

The status schema model 1500 also includes a precondition 1545, as well as other modeling elements.

In the example of the status schema model 1500, when the approval process step 1510 is switched on, the APPROVED status value 1512C of the approval status variable 1512 is a precondition for the release action 1542, as indicated by precondition indicator 1524. When the approval process step 1510 is not switched on, the APPROVED status value 1512C of the approval status variable 1512 is not a precondition for the release action 1542. Rather, as shown by precondition indicator 1545, only the CONSISTENT status value 1535B of the consistency status variable is a precondition for the release action 1542. As such, for some instances of the sales order node the approval process step must occur before the release action 1542 can occur, though not for all instances of the sales order node. The state of the sales order node instance affects whether the approval process step 1510 is required before the release action 1542 can occur. For example, some sales order of sales amount above a threshold may require approval, whereas sales orders at or under the threshold need not be approved. Similarly, the submit-for-approval action 1515, the approve action 1517, and the reject action 1519 will not be available to be performed.

Figure 16:
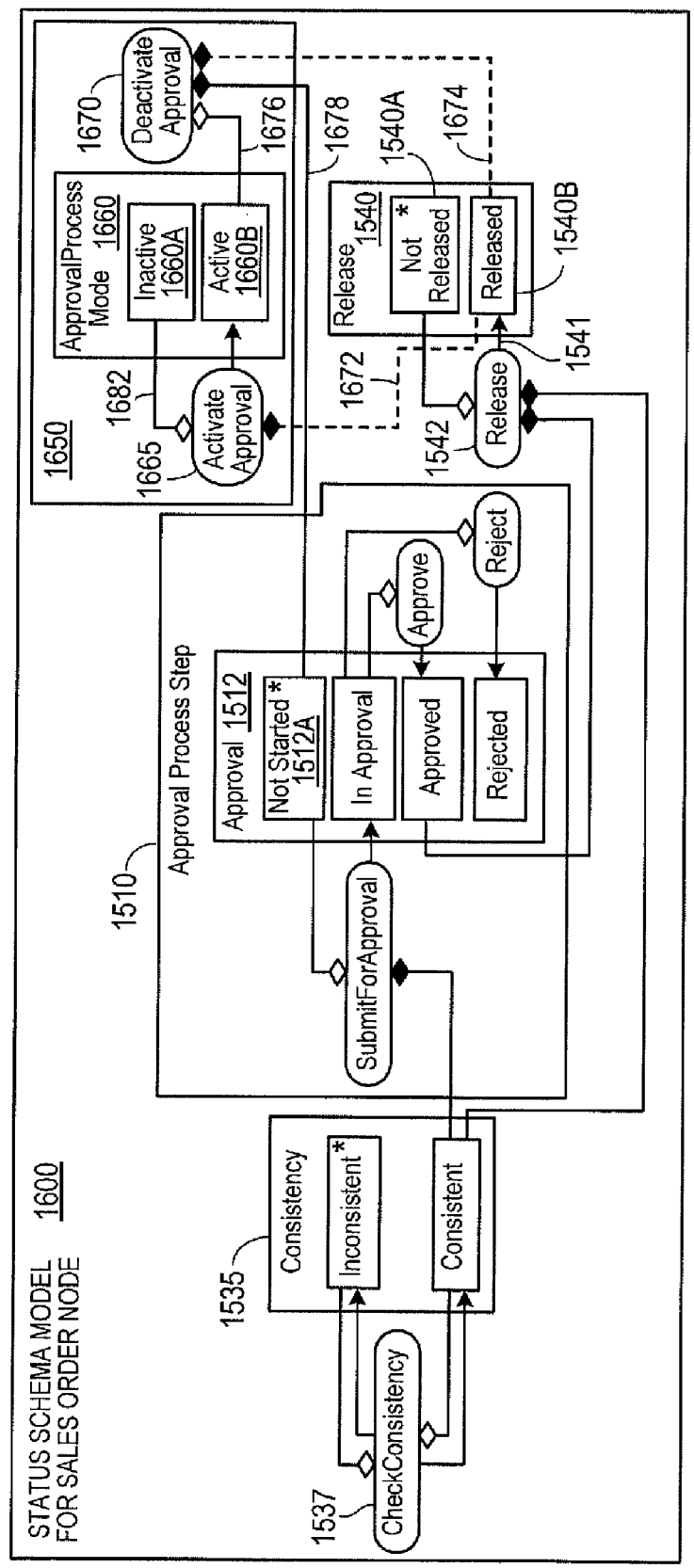

FIG. 16 illustrates an example status schema model 1600 for a sales order node. In contrast to the status schema model 1500 for a sales order node described above with respect to FIG. 15, the status schema model 1600 includes a mode schema 1650, which, in turn, includes an approval process mode variable 1660 having possible mode values of INACTIVE 1660A and ACTIVE 1660B, which describes the conditions under which the approval process step 1510 is switched on or off. The approval process step 1510 is switched on or off using the switches activate approval 1665 and deactivate approval 1670, respectively.

As shown in the example of FIG. 16, the approval process step 1510 can be switched on if the sales order has not yet been released—that is, the release action 1542 has not yet been performed for the sales order node instance. As depicted, the release action 1542 results in the release status variable 1540 having a status of RELEASED 1540B (as depicted by status transition 1541). Stated differently, the activate approval switch 1665 can only be performed for a sales order node instance when the release status variable 1540 for the sales order node instance has a status value of RELEASED (as shown by the dotted line indicator 1672).

Similarly, the approval process step 1510 cannot be deactivated (that is—the deactivate approval switch 1670 cannot be performed) unless the release action 1542 has not yet been performed for the sales order node instance (as shown by the dotted line indicator 1674 leading from the RELEASED status value 1540B of the released status variable 1540 to the deactivate approval switch 1670). Also, as shown by the example status schema model 1600, once the approval process step 1510 has been switched on, the approval process step 1510 can be switched off only if the approval process step has not yet started. This is depicted by precondition 1678 leading to the deactivate approval switch 1670 from the NOT STARTED status value 1512A of the approval status variable 1512 in the approval process step 1510. In the example status schema model 1600, the mode schema 1650 includes the approval process mode variable 1660, the activate approval switch 1665, the deactivate approval switch 1670, and the preconditions 1672, 1674, 1676, 1678, and 1682.

Figure 17:
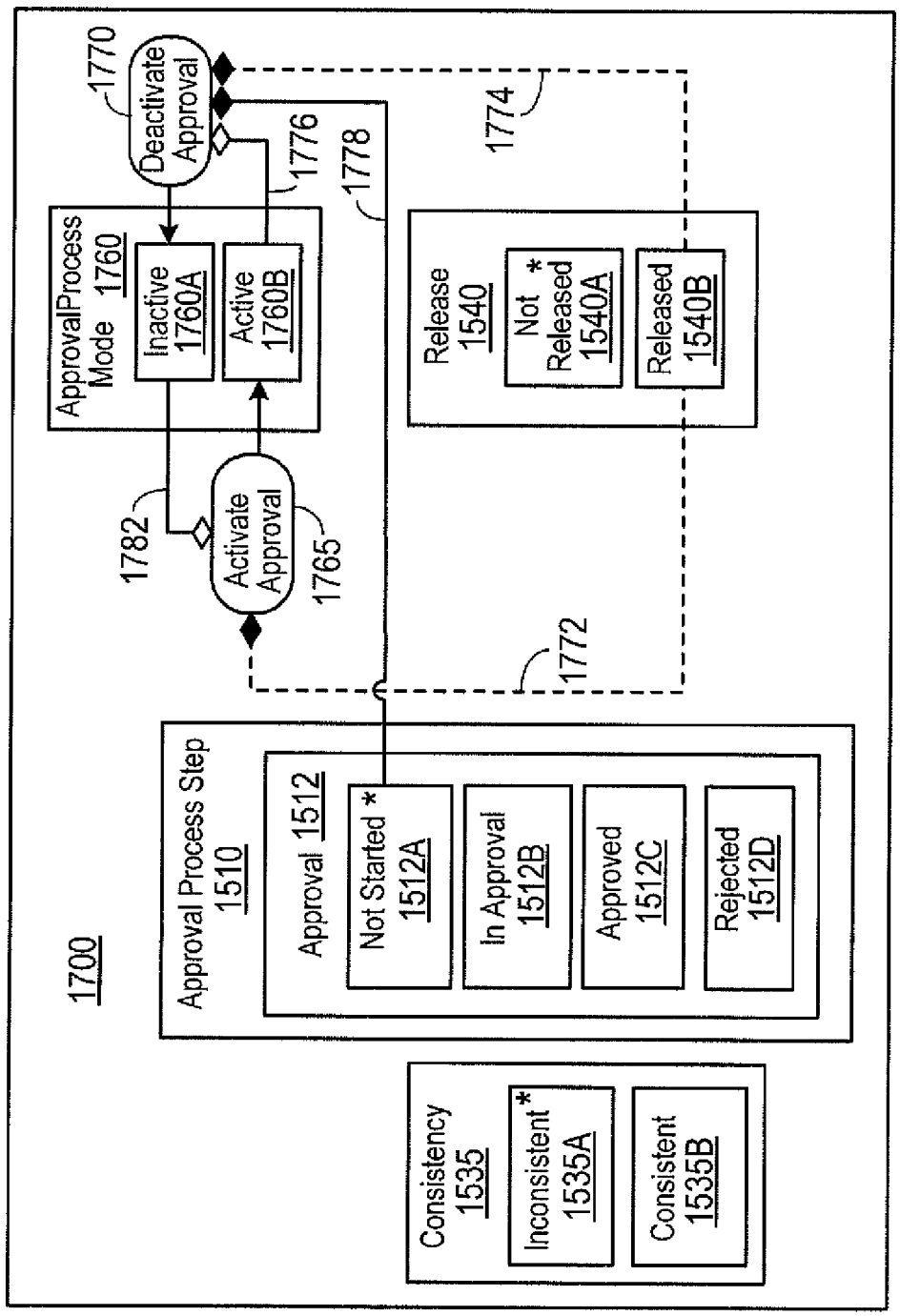
FIGS. 17 and 20 are block diagrams that depict examples of approval mode schemas.

FIG. 17 illustrates an example mode schema model 1700 that, like example mode schema model 1650 described previously with respect to FIG. 16, depicts the conditions under which an approval process step is performed and includes an approval process mode variable (here, 1760) having possible mode values of INACTIVE (here, 1760A) and ACTIVE (here, 1760B) and switches to activate approval and deactivate approval (here, switches 1765 and 1770 respectively). As illustrated, the mode schema model 1650 of FIG. 16 is integrated with the status schema model 1600, whereas the mode schema model 1700 of FIG. 17 is not. The mode schema model 1700 only displays the conditions related to the mode schema model 1700 and the switches 1665 and 1670 for switching on or off the approval process step. More particularly, the mode schema model 1700 includes the consistency status variable 1535 and the release status variable 1540, along with the approval process step 1510, which in turn, includes the approval status variable 1512 having possible status values of NOT STARTED 1512A, IN APPROVAL 1512B, APPROVED 1512C, and REJECTED 1512D.

The mode schema model examples 1700 and 1650 depict similar constraints for activating and deactivating an approval business process; however, the mode schema models 1650 and 1700 represent the constraints in different ways. As shown in the example of FIG. 17, the approval process step 1510 cannot be switched on if the sales order has been released—that is, the release status variable 1540 has a status reflecting that the release has been performed for the sales order node instance. As depicted, the release action 1542 results in the release status variable 1540 having a status of RELEASED 1540B (as depicted by status transition 1541). Stated differently, the activate approval switch 1765 cannot be performed for a sales order node instance when the release status variable 1540 for the sales order node instance has a status value of RELEASED (as shown by the dotted line indicator 1772).

Similarly, the approval process step 1510 cannot be deactivated (that is—the deactivate approval switch 1770 cannot be switched) if the released status variable 1540 has a status value of RELEASED 1540B (as shown by the dotted line indicator 1774 leading from the RELEASED status value 1740B of the released status variable 1740 to the deactivate approval switch 1770). Also, as shown by the example status schema model 1700, once the approval process step 1510 has been switched on, the approval process step 1510 can be switched off only if the approval process step has not yet started. This is depicted by precondition 1778 leading to the deactivate approval switch 1770 from the NOT STARTED status value 1512A of the approval status variable 1512 in the approval process step 1510.

Figure 18:
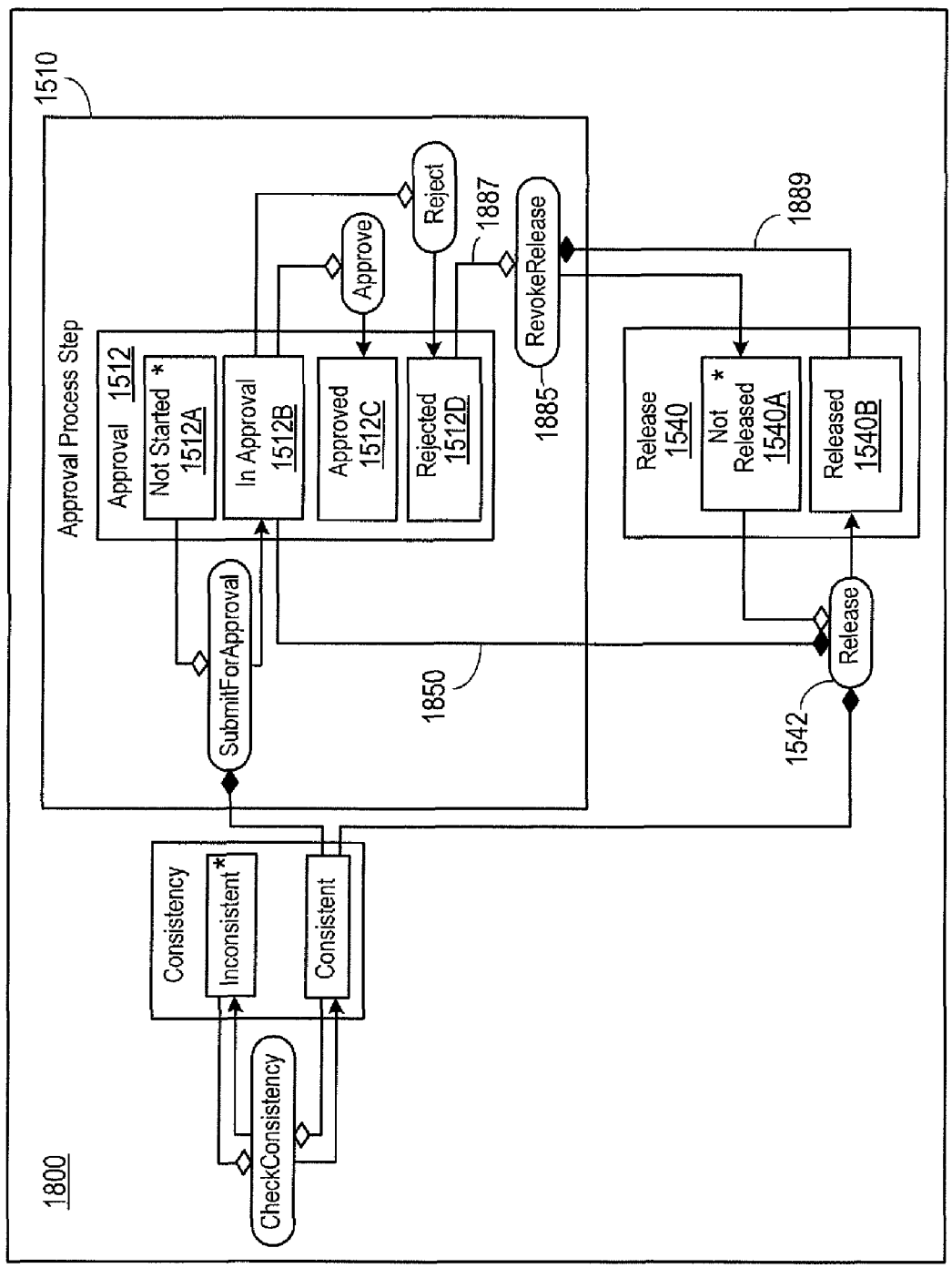
Figure 19:
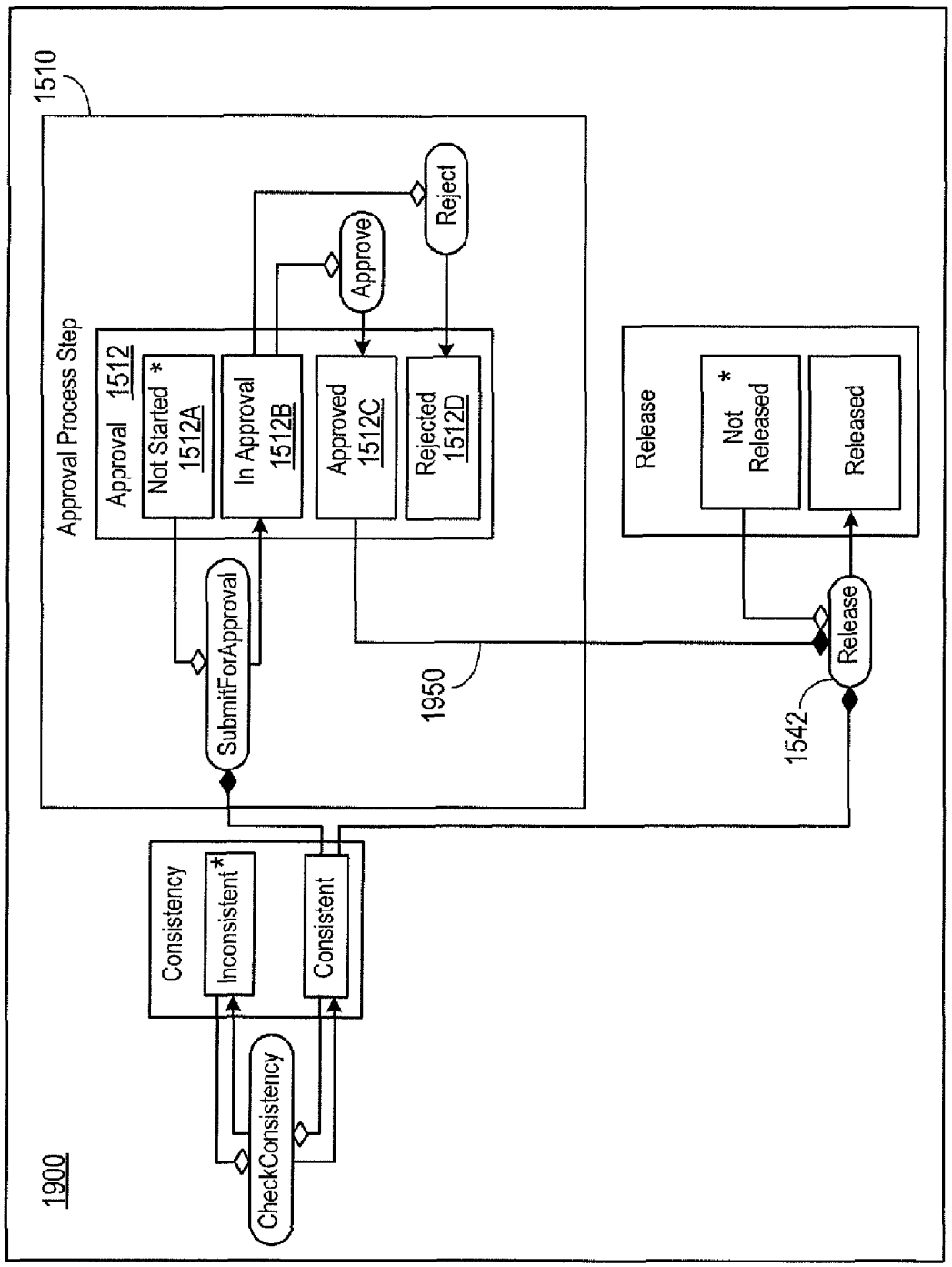

In some implementations, as illustrated by mode schema model 1700, the same status variables and values may be depicted in a mode schema model as are depicted in a status schema model. As illustrated, the status variables release 1540, approval 1512 and consistency 1535 are used both in the mode schema model 1700 and in the status schema models 1500 and 1600 for the sales order node as described previously with respect to FIGS. 15 and 16 respectively. FIGS. 18 and 19 show examples of status schema models 1800 and 1900 that model different business processes for obtaining approval using an adaptable process step (here, approval process step 1512). The example status schema model 1800 of FIG. 18 depicts a business process in which the approval process is to be started (but not necessarily completed) before the sales order can be released. This is depicted in the example of FIG. 18 by the release action 1542 having a precondition of the approval status variable 1512 having a status value of IN APPROVAL 1512B (as indicated by the precondition indicator 1850). In the business process depicted in FIG. 18, the approval process step 1510 includes a revoke release action 1885 that "unreleases" (or "undoes" or otherwise takes back a previously made release) a sales order that had been released prior to the completion of the approval process when the sales order is subsequently rejected during the approval process. This is depicted in the example of FIG. 18 by the revoke release action 1885 having preconditions of (1) the approval status variable 1512 having a status of REJECTED 1512D (as indicated by precondition indicator 1887) and (2) the release status variable 1540 having a status of RELEASED 1540B (as indicated by precondition 1889).

Referring also to FIG. 19, in contrast with the example status schema model 1800, the example status schema model 1900 of FIG. 19 depicts a business process in which the sales order must be approved before the sales order can be released. This is depicted in the example of FIG. 19 by the release action 1542 having a precondition of the approval status variable 1512 having a status value of APPROVED 1512C (as indicated by precondition indicator 1950). In the business process depicted in FIG. 19, the approval process step 1510 does not include a revoke release action 1885 as included in example status schema model 1800 shown in FIG. 18.

The approval process step 1510 depicted in example status schema model 1800 shown in FIG. 18 may be referred to as a "weak" approval process, whereas the approval process step 1510 depicted in example status schema model 1900 shown in FIG. 19 may be referred to as a "strong" approval process.

Figure 20:
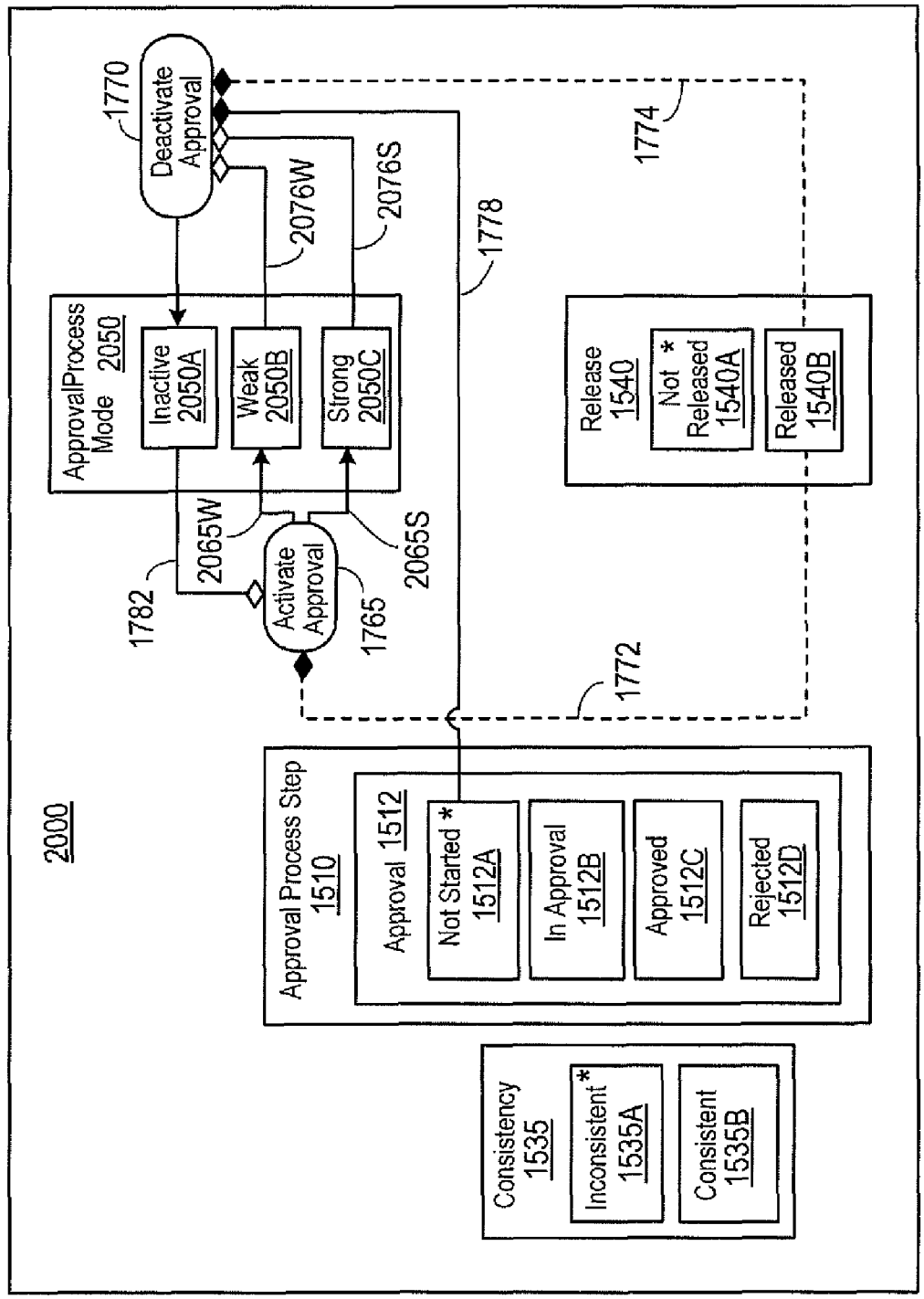

FIG. 20 depicts an example mode schema model 2000 for a sales order node that, similar to the mode schema model 1650 depicted in FIG. 16 and the mode schema model 1700 depicted in FIG. 17, illustrates conditions under which the mode of a process step can be switched according to the state of the data object node at runtime. In contrast to the mode schema model 1650 depicted in FIG. 16 and the mode schema model 1700 depicted in FIG. 17, the mode schema 2000 describes the conditions under which two approval processes (referred to respectively as "weak" and "strong," which may be implementations, for example, of the approval processes described previously with respect to FIGS. 18 and 19) may be switched on or off using the switches activate approval 1765 and deactivate approval 1770, respectively. The two approval processes for the adaptable process step may be referred to as two variants of the adaptable process step. At runtime, when the adaptable process step is switched on, one of the two variants must be selected.

The approval process mode schema 2000 includes an approval process mode variable 2050 having permitted mode values of INACTIVE 2050A, WEAK 2050B, and STRONG 2050C. In contrast to the approval process mode schema 1650 of FIG. 16 which only indicates whether the approval process step 1510 is activated or not, the approval process mode schema 2000 also indicates which one of two types of approval processes (here, weak or strong) is active. The activate approval switch 1765 may result in the values WEAK 2050B or STRONG 2050C for the approval process mode variable 2050 (as indicated by status transitions 2065W and 2065S, respectively).

In this example, there is not an option to switch from one type of approval process to the other type of approval process, though a model may allow switching between types of approval processes. In this example mode schema model 2000, to activate either the weak or strong approval process step, no approval process may have been previously activated (as shown by the precondition 1782 to the activate approval switch 1765 requiring that the approval process mode variable 2050 has a mode value of INACTIVE 2050A). Either the weak approval process or the strong approval process, respectively, can be deactivated if the approval process has been previously activated. This is illustrated by the deactivate approval switch 1770 having a precondition of a WEAK mode value 2050B or a STRONG mode value 2050C for the approval process mode variable 2050, respectively (as indicated by precondition indicators 2076W and 2076S, respectively.)

Figure 21:
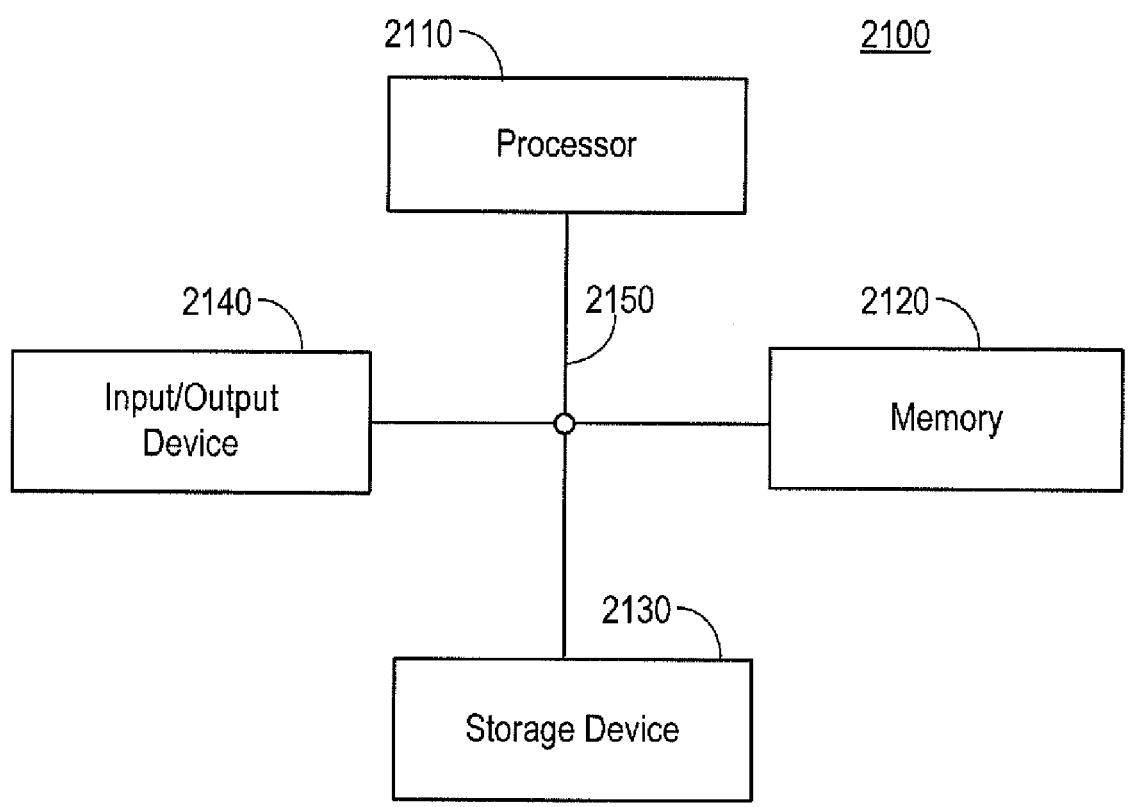

FIG. 21 is a block diagram of a computer system 2100 that can be used in the operations described above, according to one implementation. The system 2100 includes a processor 2110, a memory 2120, a storage device 2130 and an input/output device 2140. Each of the components 2110, 2120, 2130 and 2140 are interconnected using a system bus 2150. The processor 2110 is capable of processing instructions for execution within the system 2100. In some implementations, the processor 2110 is a single-threaded processor. In another implementation, the processor 2110 is a multi-threaded processor. The processor 2110 is capable of processing instructions stored in the memory 2120 or on the storage device 2130 to display graphical information for a user interface on the input/output device 2140.

The memory 2120 stores information within the system 2100. In one implementation, the memory 2120 is a computer-readable medium. In another implementation, the memory 2120 is a volatile memory unit. In still another embodiment, the memory 2120 is a non-volatile memory unit.

The storage device 2130 is capable of providing mass storage for the system 2100. In one embodiment, the storage device 2130 is a computer-readable medium. In various different embodiments, the storage device 2130 may be a floppy disk device, a hard disk device, an optical disk device, or a tape device.

For example, each of the computer systems 110, 350, and 1400 discussed previously with respect to FIGS. 1, 3 and 14, respectively, may include the processor 2110 executing computer instructions that are stored in one of memory 2120 and storage device 2130. In another example, the implementation of modeling computer system 350 described above with respect to FIG. 3 may include the computer system 2100.

The input/output device 2140 provides input/output operations for the system 2100. In one implementation, the input/output device 2140 includes a keyboard and/or pointing device. In another implementation, the input/output device 2140 includes a display unit for displaying graphical user interface as discussed above.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device, in computer-readable storage medium, or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the invention by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

The techniques can be implemented in a distributed manner. For example, the functions of the input/output device 1940 may be performed by one or more computing systems, and the functions of the processor 1910 may be performed by one or more computing systems.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations of the techniques have been described. Nevertheless, it will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer system for controlling actions in a computer-based process, the system comprising:
one or more processors operable to provide:
a status schema model that is defined at design-time that includes a modeling element indicating a process step for a business process, the process step can be switched on and off at runtime; and
a computer-readable storage device including computer-executable instructions that, when executed by the one or more processors, perform operations comprising:
creating a status schema instance for a particular data object node instance being used in a computer-based process, the status schema instance corresponding to the status schema model, and the data object node instance including a status variable, multiple status values for the status variable, and actions capable of being performed by the data object node instance, each status value of the status variable being a precondition for at least one of the actions, the preconditions identifying whether the associated action is to be allowed to be performed at runtime by the data object node instance conditioned on the process step being switched on;

based on the status schema instance and if the process step is switched on; monitoring a status of the status value of the status variable of the data object node instance to determine whether a precondition associated with a particular action is satisfied;

in response to the determination that the precondition is satisfied, enabling the particular action to be executed; and in response to executing the particular action, altering the status value of the status variable.

2. The system of claim 1 further comprising instructions stored in computer-readable medium that, when executed, switch on the process step at runtime based on the status of the data object node instance.

3. The system of claim 1 further comprising instructions stored in computer-readable medium that, when executed, switch off the process step at runtime based on the status of the data object node instance.

4. The system of claim 1 wherein:
the status schema model corresponds to a data object node, and
the data object node instance corresponds to the data object node.

5. The system of claim 1 wherein the modeling element indicating the process step comprises the action, the action is inhibited if the process step is switched off.

6. The system of claim 1 wherein the modeling element indicating the process step comprises a status variable, the status variable is disabled and does not have a well-defined value if the process step is switched off.

7. The system of claim 1 further comprising:
a mode schema model that is defined at design-time, stored in computer-readable medium and identifies conditions under which the process step is allowed to be switched; and
instructions stored in computer-readable medium that, when executed, create a mode schema instance for the data object node instance, wherein mode schema instance corresponds to the mode schema model.

8. The system of claim 7 wherein the mode schema model includes a mode variable identifying whether the process step is switched on.

9. The system of claim 7 wherein:
the process step includes variants, and
a variant of the process step is selected when the process step is switched on.

10. The system of claim 9 wherein:
the mode schema includes a mode variable identifying which variant of the process step is switched on, and
the mode scheme indicates under what conditions the variant is switched on.

11. A non-transitory computer-readable storage medium encoded with a computer program product for controlling actions in a computer-based process, the computer program product comprising:

a status schema model repository for status schema models, wherein:
a status schema model is defined at design-time that includes a modeling element indicating a process step for a business process, the process step can be switched on and off at runtime; and
instructions that, when executed, perform operations comprising:
creating a status schema instance for a particular data object node instance being used in a computer-based process, the status schema instance corresponding to the status schema model, and the data object node instance including a status variable, multiple status values for the status variable, and actions capable of being performed by the data object node instance, each status value of the status variable being a precondition for at least one of the actions, the preconditions identifying whether the associated action is to be allowed to be performed at runtime by the data object node instance conditioned on the process step being switched on;
based on the status schema instance and if the process step is switched on, monitoring a status of the status value of the status variable of the data object node instance to determine whether a precondition associated with a particular action is satisfied;
in response to the determination that the precondition is satisfied, enabling the particular action to be executed; and
in response to executing the particular action, altering the status value of the status variable.

12. The computer-readable storage medium of claim 11 further comprising instructions stored in computer-readable medium that, when executed, switch on the process step at runtime based on the status of the data object node instance.

13. The computer-readable storage medium of claim 11 further comprising instructions stored in computer-readable medium that, when executed, switch off the process step at runtime based on the status of the data object node instance.

14. The computer-readable storage medium of claim 11 wherein: the status schema model corresponds to a data object node, and
the data object node instance corresponds to the data object node.

15. The computer-readable storage medium of claim 11 wherein the modeling element indicating the process step comprises the action, the action is inhibited if the process step is switched off.

16. The computer-readable storage medium of claim 11 wherein the modeling element indicating the process step comprises a status variable, the status variable is disabled and does not have a well-defined value if the process step is switched off.

17. The computer-readable storage medium of claim 11 further comprising:
a mode schema model that is defined at design-time and identifies conditions under which the process step is allowed to be switched; and
instructions that, when executed, create a mode schema instance for the data object node instance, wherein mode schema instance corresponds to the mode schema model.

18. The computer-readable storage medium of claim 17 wherein the mode schema model includes a mode variable identifying whether the process step is switched on.

* * * * *